(12) United States Patent
Kim et al.

(10) Patent No.: US 9,572,090 B2
(45) Date of Patent: *Feb. 14, 2017

(54) METHOD AND APPARATUS FOR UPDATING SYSTEM INFORMATION IN WIRELESS LAN SYSTEM

(71) Applicant: LG Electronics Inc., Seoul (KR)

(72) Inventors: Jeongki Kim, Anyang-si (KR); Jinsam Kwak, Anyang-si (KR); Yongho Seok, Anyang-si (KR); Seunghee Han, Anyang-si (KR); Jinsoo Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,061

(22) Filed: Aug. 15, 2016

(65) Prior Publication Data

US 2016/0360473 A1    Dec. 8, 2016

Related U.S. Application Data

(63) Continuation of application No. 14/394,168, filed as application No. PCT/KR2013/003135 on Apr. 15, 2013, now Pat. No. 9,451,479.

(Continued)

(51) Int. Cl.
*H04W 24/02* (2009.01)
*H04W 48/14* (2009.01)
(Continued)

(52) U.S. Cl.
CPC ............ *H04W 48/14* (2013.01); *H04W 48/16* (2013.01); *H04W 72/0446* (2013.01); *H04W 84/12* (2013.01)

(58) Field of Classification Search
CPC .. H04W 48/14; H04W 72/0446; H04W 48/16; H04W 84/12; H04W 24/02; H04W 48/10; H04W 24/04
See application file for complete search history.

(56) References Cited

U.S. PATENT DOCUMENTS

| | | | |
|---|---|---|---|
| 2005/0164683 | A1 | 7/2005 | Roberts et al. |
| 2006/0068780 | A1 | 3/2006 | Dalsgaard et al. |
| | | (Continued) | |

FOREIGN PATENT DOCUMENTS

| | | | |
|---|---|---|---|
| EP | 2323426 A1 | 5/2011 | |
| EP | 2398278 A2 | 12/2011 | |
| | (Continued) | | |

*Primary Examiner* — Thai Nguyen
(74) *Attorney, Agent, or Firm* — Dentons US LLP

(57) ABSTRACT

The present invention relates to a wireless communication system, and more particularly, to a method and apparatus for updating system information in a wireless LAN system. A method for a station (STA) to update system information in a wireless communication system according to one embodiment of the present invention comprises the steps of: if the value of a change sequence field received by the STA from an access point (AP) is different from the value of the change sequence field stored in the STA, transmitting, to the AP, a probe request frame including the change sequence field set to the value of the change sequence field stored in the STA; and a step of receiving, from the AP, a probe response frame responding to the probe request frame including the change sequence field.

8 Claims, 27 Drawing Sheets

Related U.S. Application Data

(60) Provisional application No. 61/623,588, filed on Apr. 13, 2012, provisional application No. 61/676,337, filed on Jul. 27, 2012.

(51) Int. Cl.
  *H04W 48/16* (2009.01)
  *H04W 72/04* (2009.01)
  *H04W 84/12* (2009.01)

(56) References Cited

U.S. PATENT DOCUMENTS

| | | | |
|---|---|---|---|
| 2007/0287440 A1 | 12/2007 | Benkert et al. | |
| 2008/0108376 A1* | 5/2008 | Chen | H04H 40/18 455/466 |
| 2013/0142124 A1* | 6/2013 | Abraham | H04W 28/06 370/328 |
| 2013/0301569 A1* | 11/2013 | Wang | H04L 5/0055 370/329 |

FOREIGN PATENT DOCUMENTS

| | | |
|---|---|---|
| KR | 10-2009-0089367 A | 8/2009 |
| KR | 10-2010-0126298 A | 12/2010 |
| KR | 10-2011-0115099 A | 10/2011 |
| WO | 2011030956 A1 | 3/2011 |

\* cited by examiner 802.11 Components

Otects          1

METHOD AND APPARATUS FOR UPDATING SYSTEM INFORMATION IN WIRELESS LAN SYSTEM

This application is a Continuation of U.S. application Ser. No. 14/394,168 filed Oct. 13, 2014, which is a National Stage under 35 U.S.C. 371 of International Application No. PCT/KR2013/003135 filed Apr. 15, 2013, which claims the benefit of U.S. Provisional Application No. 61/623,588 filed Apr. 13, 2012 and 61/676,337 filed Jul. 27, 2012, all of which are hereby incorporated by reference in their entirety.

TECHNICAL FIELD

The present invention relates to a wireless communication system, and more particularly, to a method and apparatus for updating system information in a wireless local area network (LAN) system.

BACKGROUND ART

Recently, with development of information communication technology, various wireless communication technologies have been developed. Among others, a wireless local area network (WLAN) enables wireless access to the Internet using a portable terminal such as a personal digital assistant (PDA), a laptop, a portable multimedia player (PMP) in a home, an enterprise or a specific service provision area based on radio frequency technology.

In order to overcome limitations in communication rate which have been pointed out as weakness of a WLAN, in recent technical standards, a system for increasing network speed and reliability and extending wireless network distance has been introduced. For example, in IEEE 802.11n, multiple input and multiple output (MIMO) technology using multiple antennas in a transmitter and a receiver has been introduced in order to support high throughput (HT) with a maximum data rate of 540 Mbps or more, to minimize transmission errors, and to optimize data rate.

DISCLOSURE

Technical Problem

As next-generation communication technology, machine-to-machine (M2M) communication technology has been discussed. Even in an IEEE 802.11 WLAN system, technical standards supporting M2M communication have been developed as IEEE 802.11ah. In M2M communication, a scenario in which a small amount of data is communicated at a low rate may be considered in an environment in which many apparatuses are present.

Communication in a WLAN system is performed in a medium shared between all apparatuses. As in M2M communication, when the number of apparatuses is increased, if a long period of time is taken for channel access of one device, overall system performance may be degraded and power saving of each device may be impeded.

An object of the present invention devised to solve the problem lies in a new mechanism for updating system information.

It is to be understood that both the foregoing general description and the following detailed description of the present invention are exemplary and explanatory and are intended to provide further explanation of the invention as claimed.

Technical Solution

The object of the present invention can be achieved by providing a method for updating system information by a station (STA) of a wireless communication system, the method including transmitting a probe request frame including a change sequence field set as a value of a change sequence field stored in the STA, to the AP when a value of a change sequence field received from an access point (AP) by the STA is different from the value of the change sequence field stored in the STA, and receiving a probe response frame, including the change sequence field, responding to the probe request frame from the AP.

In another aspect of the present invention, provided herein is a method for providing system information updated in an access point (AP) of a wireless communication system, the method including receiving a probe request frame including a change sequence field from a station (STA), and transmitting a probe response frame, including the change sequence field, responding to the probe request frame to the STA, wherein the probe request frame is received from the STA by the AP when a value of a change sequence field received from the AP by the STA is different from a value of a change sequence field stored in the STA, and the value of the change sequence field included in the probe request frame is set as the value of the change sequence field stored in the STA.

In another aspect of the present invention, provided herein is a station (STA) apparatus for updating system information in a wireless communication system, the STA apparatus including a transceiver, and a processor, wherein the processor is configured to transmit a probe request frame including a change sequence field set as a value of a change sequence field stored in the STA, to the AP using the transceiver when a value of a change sequence field received from an access point (AP) by the STA is different from the value of the change sequence field stored in the STA and to receive a probe response frame, including the change sequence field, responding to the probe request frame from the AP using the transceiver.

In another aspect of the present invention, provided herein is an access point (AP) apparatus for providing system information updated in a wireless communication system, the AP apparatus including a transceiver, and a processor, wherein the processor is configured to receive a probe request frame including a change sequence field from a station (STA) using the transceiver and to transmit a probe response frame, including the change sequence field, responding to the probe request frame to the STA using the transceiver, the probe request frame is received from the STA by the AP when a value of a change sequence field received from the AP by the STA is different from a value of a change sequence field stored in the STA, and the value of the change sequence field included in the probe request frame is set as the value of the change sequence field stored in the STA.

The embodiments of the present invention may have the following features.

The change sequence field received from the AP by the STA may be included in a short beacon frame transmitted from the AP.

The change sequence field stored in the STA may be a change sequence field received before the short beacon frame is received from the AP by the STA.

The probe request frame including the change sequence field may be a probe request frame for acquisition of updated system information.

The probe response frame may include one or more elements of system information to be updated by the STA when a current change sequence value of the AP is different from a value of a change sequence included in the probe request frame.

The probe response frame may include only the one or more elements of the system information to be updated by the STA and the change sequence field set as a value corresponding to current system information.

The probe request frame including the change sequence field may not be transmitted when a value of a change sequence field received by the STA from the AP is the same as the value of the change sequence field stored in the STA.

The probe response frame including one or more elements of system information to be updated by the STA may not be received when a value of a current change sequence of the AP is the same as a value of a change sequence included in the probe request frame.

The change sequence field may be a field indicating change in the system information.

The change sequence field may be defined as octet size 1 and configured as one value of 0 to 255.

The value of the change sequence field may be increased by 1 when at least one element of the system information is changed.

It is to be understood that both the foregoing general description and the following detailed description of the present invention are exemplary and explanatory and are intended to provide further explanation of the invention as claimed.

Advantageous Effects

The present invention may provide a new method and apparatus for updating system information.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
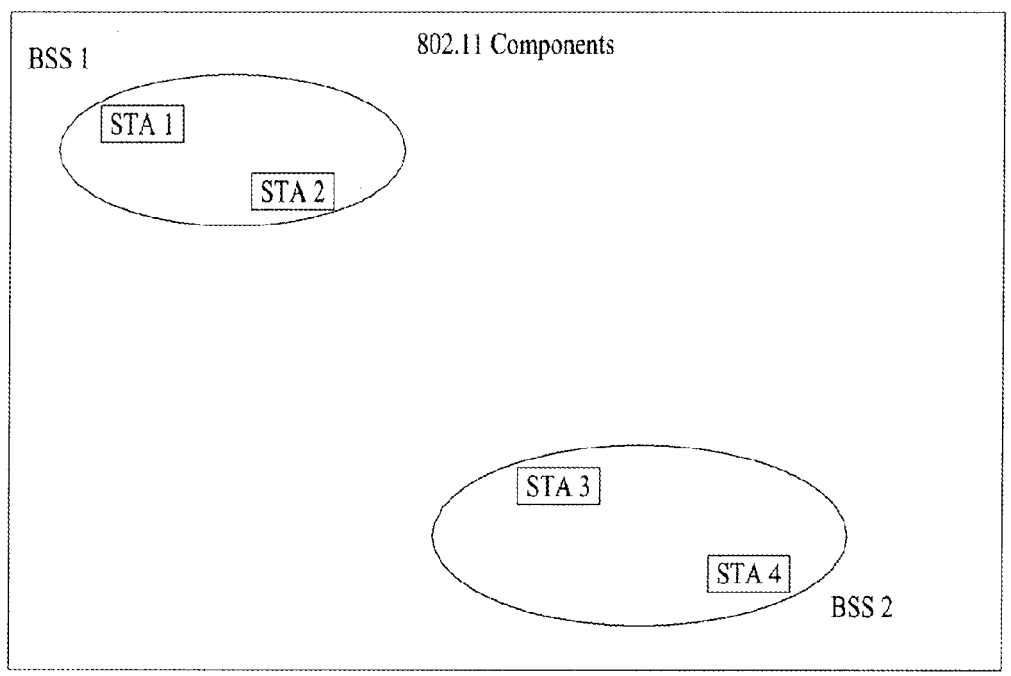
FIG. 1 is a diagram showing an exemplary structure of an IEEE 802.11 system to which the present invention is applicable.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, institute of electrical and electronics engineers (IEEE) 802, $3^{rd}$ generation partnership project (3GPP), 3GPP long term evolution (3GPP LTE), LTE-advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as Global System for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved-UTRA (E-UTRA) etc. For clarity, this application focuses on the IEEE 802.11 system. However, the technical features of the present invention are not limited thereto.

Structure of WLAN System

FIG. 1 illustrates an exemplary structure of an IEEE 802.11 system to which the present invention is applicable.

IEEE 802.11 can be composed of a plurality of components and provide a WLAN supporting STA mobility transparent for higher layers according to interaction of the components. A basic service set (BSS) may correspond to a basic component block in an IEEE 802.11 LAN. FIG. 1 shows 2 BSSs (BSS1 and BSS2) each of which includes 2 STAs as members (STA1 and STA2 being included in BSS1 and STA3 and STA4 being included in BSS2). In FIG. 1, an oval that defines a BSS indicates a coverage area in which STAs belonging to the corresponding BSS perform communication. This area may be called a basic service area (BSA). When an STA moves out of the BSA, the STA cannot directly communicate with other STAs in the BSA.

A most basic BSS in the IEEE 802.11 LAN is an independent BSS (IBSS). For example, the IBSS can have a minimum configuration including only 2 STAs. The IBSS has a simplest form and corresponds to the BSS (BSS1 or BSS2) shown in FIG. 1, in which components other than STA are omitted. This configuration is possible when STAs can directly communicate with each other. This type of LAN can be configured as necessary rather than being previously designed and configured and may be called an ad-hoc network.

When an STA is turned on or off, or enters or exits the coverage of a BSS, membership of the STA in the BSS can be dynamically changed. To become a member of the BSS, the STA can join the BSS using a synchronization process. To access all services based on the BSS, the STA needs to associate with the BSS. Association may be dynamically set and may use a distribution system service (DSS).

Figure 2:
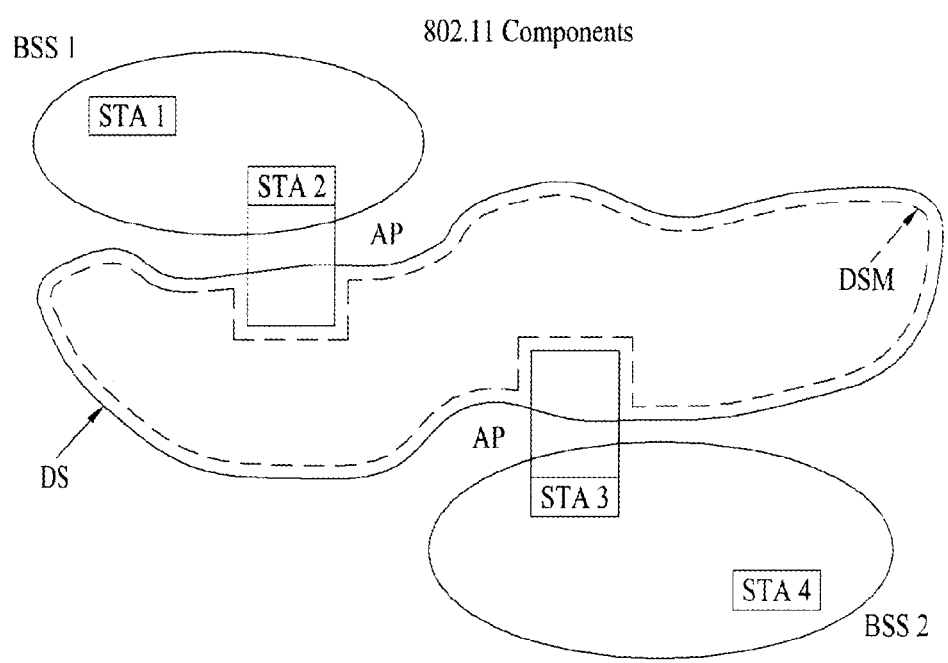
FIG. 2 is a diagram showing another exemplary structure of an IEEE 802.11 system to which the present invention is applicable.

FIG. 2 illustrates another exemplary configuration of an IEEE 802.11 system to which the present invention is applicable. FIG. 2 shows a distribution system (DS), a distribution system medium (DSM) and an access point (AP) in addition to the configuration of FIG. 1.

In a LAN, a direct station-to-station distance may be limited by PHY performance. While this distance limit can be sufficient in some cases, communication between stations having a long distance therebetween may be needed in some cases. The DS may be configured to support an extended coverage.

The DS refers to a structure in which BSSs are connected to each other. Specifically, BSSs may be present as components of an extended form of a network composed of a plurality of BSSs rather than being independently present as shown in FIG. 1.

The DS is a logical concept and may be specified by characteristics of the DSM. IEEE 802.11 logically discriminates a wireless medium (WM) from the DSM. The logical media are used for different purposes and used by different components. IEEE 802.11 does not limit the media as the same medium or different media. The fact that plural media are logically different from each other can explain flexibility of IEEE 802.11 LAN (DS structure or other network structures). That is, the IEEE 802.11 LAN can be implemented in various manners and physical characteristics of implementations can independently specify corresponding LAN structures.

The DS can support mobile devices by providing seamless integration of a plurality of BSSs and logical services necessary to handle addresses to a destination.

The AP refers to an entity that enables associated STAs to access the DS through a WM and has STA functionality. Data can be transmitted between a BSS and the DS through the AP. For example, STA2 and STA3 have STA functionality and provide a function of enabling associated STAs (STA1 and STA4) to access the DS. Furthermore, all APs are addressable entities because they basically correspond to an STA. An address used by an AP for communication on the WM is not necessarily equal to an address used by the AP for communication on the DSM.

Data transmitted from one of STAs associated with an AP to an STA address of the AP can be received at an uncontrolled port at all times and processed by an IEEE 802.1X port access entity. Furthermore, the transmitted data (or frame) can be delivered to the DS when a controlled port is authenticated.

Figure 3:
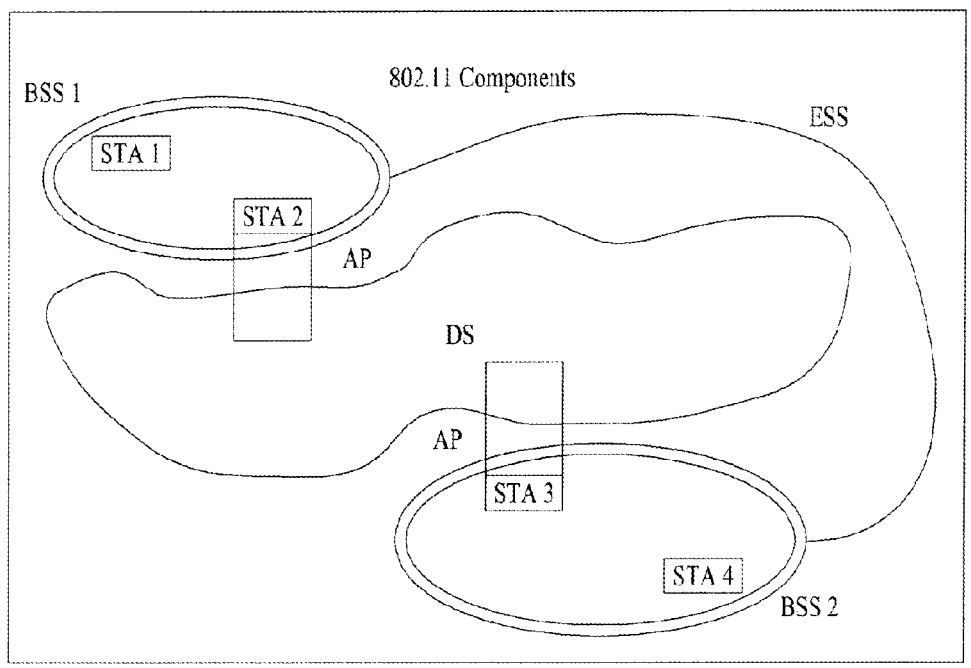
FIG. 3 is a diagram showing another exemplary structure of an IEEE 802.11 system to which the present invention is applicable.

FIG. 3 illustrates another exemplary configuration of an IEEE 802.11 system to which the present invention is applicable. FIG. 3 shows an extended service set (ESS) for providing an extended coverage in addition to the configuration of FIG. 2.

A wireless network having an arbitrary size and complexity may be composed of a DS and an ESS. This type of network is called an ESS network in IEEE 802.11. The ESS may correspond to a set of BSSs connected to a DS. However, the ESS does not include the DS. The ESS network looks like an IBSS network at a logical link control (LLC) layer. STAs belonging to the ESS can communicate with each other and mobile STAs can move from a BSS to another BSS (in the same ESS) transparently to LCC.

IEEE 802.11 does not define relative physical positions of BSSs in FIG. 3 and the BSSs may be located as follows. The BSSs can partially overlap, which is a structure normally used to provide continuous coverage. The BSSs may not be physically connected to each other and there is a limit on the logical distance between the BSSs. In addition, the BSSs may be physically located at the same position in order to provide redundancy. Furthermore, one (or more) IBSS or ESS networks may be physically located in the same space as one (or more ESS) network. This may correspond to an ESS network form when an ad-hoc network operates in the location of the ESS network, IEEE 802.11 networks, which physically overlap, are configured by different organizations or two or more different access and security policies are needed at the same position.

Figure 4:
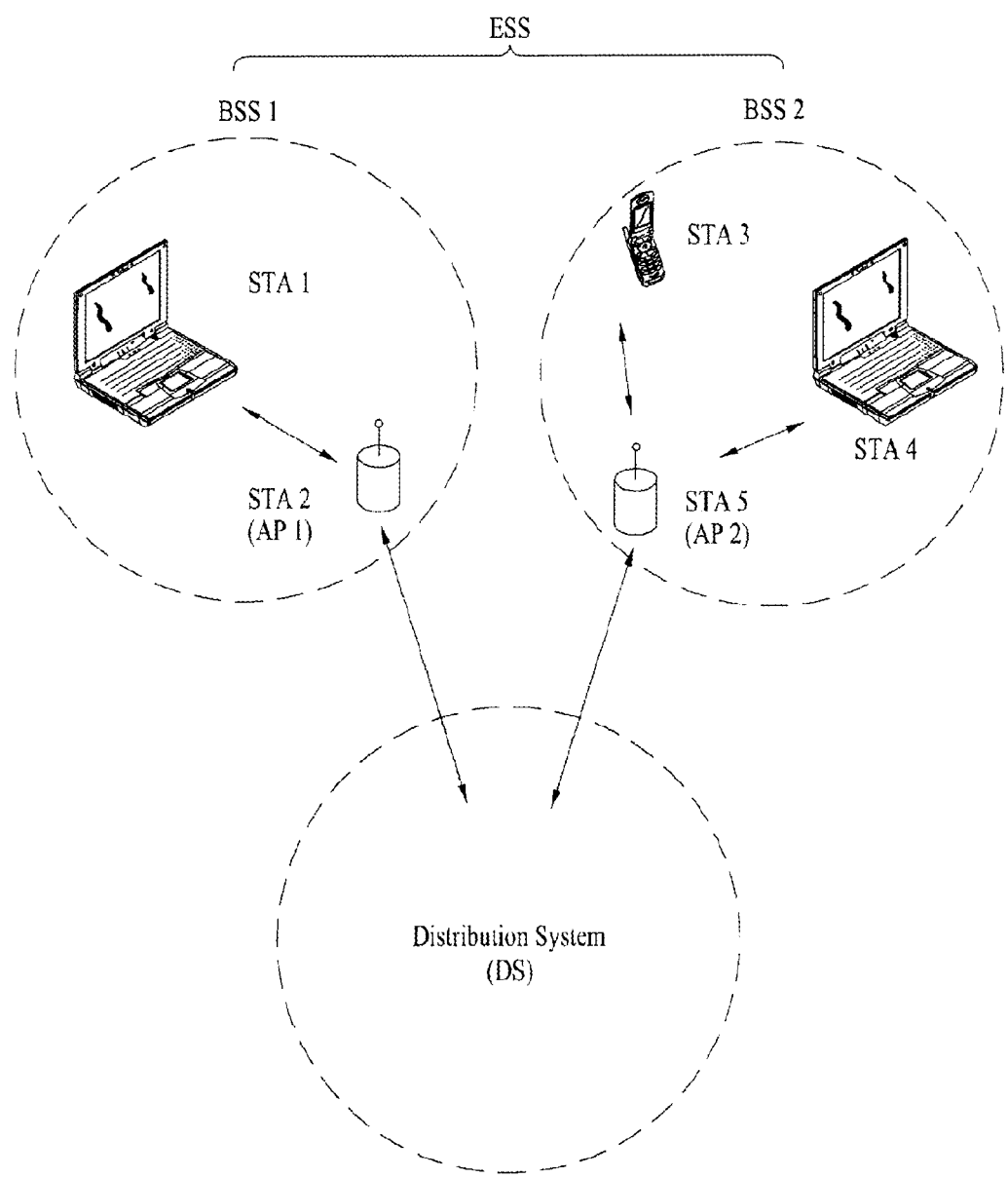
FIG. 4 is a diagram showing an exemplary structure of a wireless local area network (WLAN) system.

FIG. 4 illustrates an exemplary configuration of a WLAN system. FIG. 4 shows an example of a BSS based on a structure including a DS.

In the example of FIG. 4, BSS1 and BSS2 constitute an ESS. In the WLAN system, STAs are devices operating according to MAC/PHY regulations of IEEE 802.11. The STAs include an AP STA and a non-AP STA. The non-AP STA corresponds to a device directly handled by a user, such as a laptop computer, a cellular phone, etc. In the example of FIG. 4, STA1, STA3 and STA4 correspond to the non-AP STA and STA2 and STA5 correspond to the AP STA.

In the following description, the non-AP STA may be called a terminal, wireless transmit/receive unit (WTRU), user equipment (UE), mobile station (MS), motile terminal, mobile subscriber station (MSS), etc. The AP corresponds to a base station (BS), node-B, evolved node-B, base transceiver system (BTS), femto BS, etc in other wireless communication fields.

Link Setup Process

Figure 5:
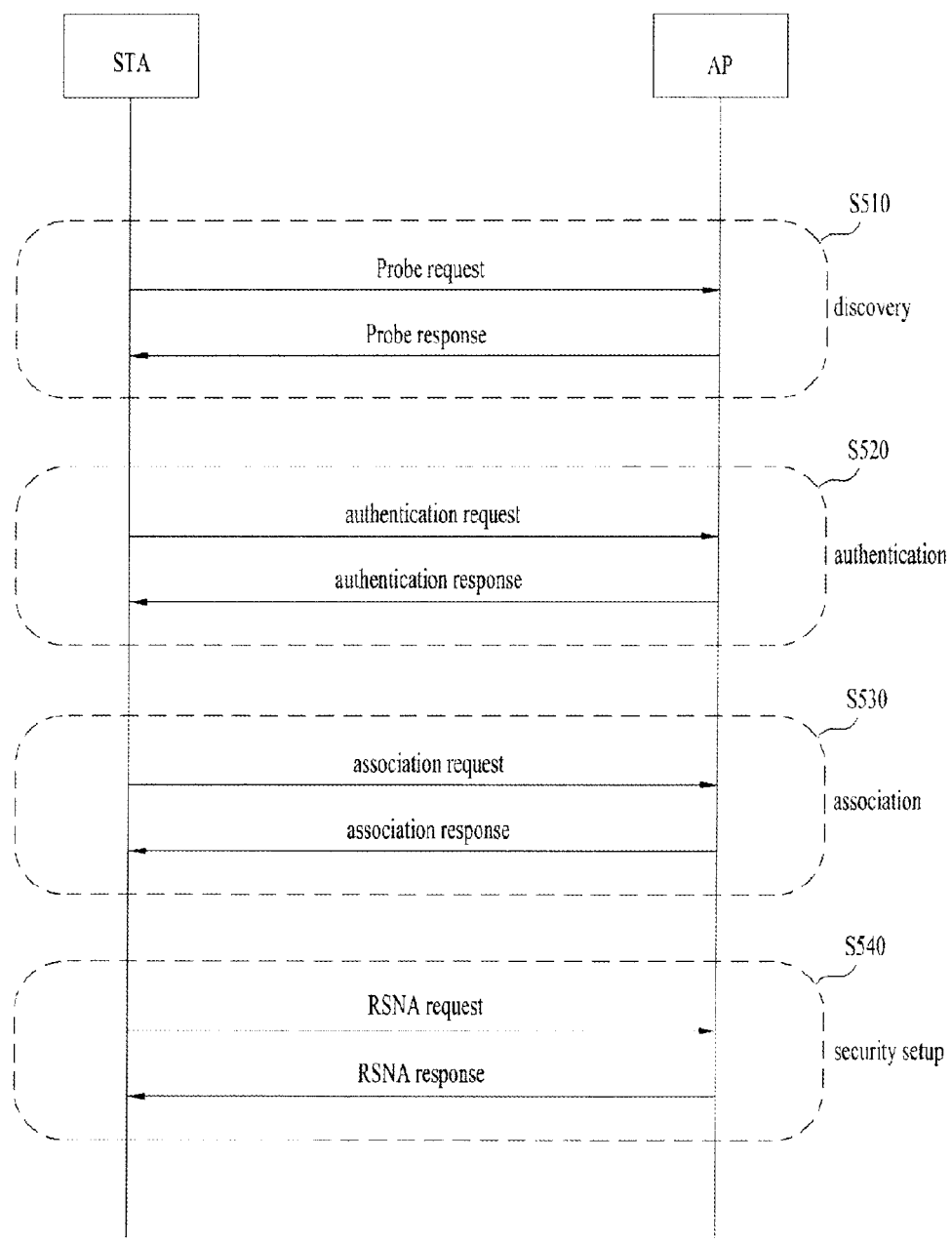
FIG. 5 is a diagram illustrating a link setup process in a WLAN system.

FIG. 5 is a diagram illustrating a general link setup process.

In order to establish a link with respect to a network and perform data transmission and reception, an STA discovers the network, performs authentication, establishes association and performs an authentication process for security. The link setup process may be referred to as a session initiation process or a session setup process. In addition, discovery, authentication, association and security setup of the link setup process may be collectively referred to as an association process.

An exemplary link setup process will be described with reference to FIG. 5.

In step S510, the STA may perform a network discovery operation. The network discovery operation may include a scanning operation of the STA. That is, the STA discovers the network in order to access the network. The STA should identify a compatible network before participating in a wireless network and a process of identifying a network present in a specific area is referred to as scanning.

The scanning method includes an active scanning method and a passive scanning method.

In FIG. 5, a network discovery operation including an active scanning process is shown. In active scanning, the STA which performs scanning transmits a probe request frame while moving between channels and waits for a response thereto, in order to detect which AP is present. A responder transmits a probe response frame to the STA, which transmitted the probe request frame, as a response to the probe request frame. The responder may be an STA which lastly transmitted a beacon frame in a BSS of a scanned channel. In the BSS, since the AP transmits the beacon frame, the AP is the responder. In the IBSS, since the STAs in the IBSS alternately transmit the beacon frame, the responder is not fixed. For example, the STA which transmits the probe request frame on a first channel and receives the probe response frame on the first channel stores BSS related information included in the received probe response frame, moves to a next channel (e.g., a second channel) and performs scanning (probe request/response transmission/reception on the second channel) using the same method.

Although not shown in FIG. 5, a scanning operation may be performed using a passive scanning method. In passive scanning, the STA which performs scanning waits for a beacon frame while moving between channels. The beacon frame is a management frame in IEEE 802.11 and is periodically transmitted in order to indicate presence of a wireless network and to enable the STA, which performs scanning, to discover and participate in the wireless network. In the BSS, the AP is responsible for periodically transmitting the beacon frame. In the IBSS, the STAs alternately transmit the beacon frame. The STA which performs scanning receives the beacon frame, stores information about the BSS included in the beacon frame, and records beacon frame information of each channel while moving to another channel. The STA which receives the beacon frame may store BSS related information included in the received beacon frame, move to a next channel and perform scanning on the next channel using the same method.

Active scanning has delay and power consumption less than those of passive scanning.

After the STA has discovered the network, an authentication process may be performed in step S520. Such an authentication process may be referred to as a first authentication process to be distinguished from a security setup operation of step S540.

The authentication process includes a process of, at the STA, transmitting an authentication request frame to the AP and, at the AP, transmitting an authentication response frame to the STA in response thereto. The authentication frame used for authentication request/response corresponds to a management frame.

The authentication frame may include information about an authentication algorithm number, an authentication transaction sequence number, a status code, a challenge text, a robust security network (RSN), a finite cyclic group, etc. The information may be examples of information included in the authentication request/response frame and may be replaced with other information. The information may further include additional information.

The STA may transmit the authentication request frame to the AP. The AP may determine whether authentication of the STA is allowed, based on the information included in the received authentication request frame. The AP may provide the STA with the authentication result via the authentication response frame.

After the STA is successfully authenticated, an association process may be performed in step S530. The association process includes a process of, at the STA, transmitting an association request frame to the AP and, at the AP, transmitting an association response frame to the STA in response thereto.

For example, the association request frame may include information about various capabilities, beacon listen interval, service set identifier (SSID), supported rates, RSN, mobility domain, supported operating classes, traffic indication map (TIM) broadcast request, interworking service capability, etc.

For example, the association response frame may include information about various capabilities, status code, association ID (AID), supported rates, enhanced distributed channel access (EDCA) parameter set, received channel power indicator (RCPI), received signal to noise indicator (RSNI), mobility domain, timeout interval (association comeback time), overlapping BSS scan parameter, TIM broadcast response, QoS map, etc.

This information is purely exemplary information included in the association request/response frame and may be replaced with other information. This information may further include additional information.

After the STA is successfully authenticated, a security setup process may be performed in step S540. The security setup process of step S540 may be referred to as an authentication process through a robust security network association (RSNA) request/response. The authentication process of step S520 may be referred to as the first authentication process and the security setup process of step S540 may be simply referred to as an authentication process.

The security setup process of step S540 may include a private key setup process through 4-way handshaking of an extensible authentication protocol over LAN (EAPOL) frame. In addition, the security setup process may be performed according to a security method which is not defined in the IEEE 802.11 standard.

Evolution of WLAN

As a technical standard recently established in order to overcome limitations in communication speed in a WLAN, IEEE 802.11n has been devised. IEEE 802.11n aims at increasing network speed and reliability and extending wireless network distance. More specifically, IEEE 802.11n is based on multiple input and multiple output (MIMO) technology using multiple antennas in a transmitter and a receiver in order to support high throughput (HT) with a maximum data rate of 540 Mbps or more, to minimize transmission errors, and to optimize data rate.

As WLANs have come into widespread use and applications using the same have been diversified, recently, there is a need for a new WLAN system supporting throughput higher than a data rate supported by IEEE 802.11n. A next-generation WLAN system supporting very high throughput (VHT) is a next version (e.g., IEEE 802.11ac) of the IEEE 802.11n WLAN system and is an IEEE 802.11 WLAN system newly proposed in order to support a data rate of 1 Gbps or more at a MAC service access point (SAP).

The next-generation WLAN system supports a multi-user MIMO (MU-MIMO) transmission scheme by which a plurality of STAs simultaneously accesses a channel in order to efficiently use a radio channel. According to the MU-MIMO transmission scheme, the AP may simultaneously transmit packets to one or more MIMO-paired STAs.

In addition, support of a WLAN system operation in a whitespace is being discussed. For example, introduction of a WLAN system in a TV whitespace (WS) such as a frequency band (e.g., 54 to 698 MHz) in an idle state due to digitalization of analog TVs is being discussed as the IEEE 802.11af standard. However, this is only exemplary and the whitespace may be incumbently used by a licensed user. The licensed user means a user who is allowed to use a licensed band and may be referred to as a licensed device, a primary user or an incumbent user.

For example, the AP and/or the STA which operate in the WS should provide a protection function to the licensed user. For example, if a licensed user such as a microphone already uses a specific WS channel which is a frequency band divided on regulation such that a WS band has a specific bandwidth, the AP and/or the STA cannot use the frequency band corresponding to the WS channel in order to protect the licensed user. In addition, the AP and/or the STA must stop use of the frequency band if the licensed user uses the frequency band used for transmission and/or reception of a current frame.

Accordingly, the AP and/or the STA should perform a procedure of determining whether a specific frequency band in a WS band is available, that is, whether a licensed user uses the frequency band. Determining whether a licensed user uses a specific frequency band is referred to as spectrum sensing. As a spectrum sensing mechanism, an energy detection method, a signature detection method, etc. may be used. It may be determined that the licensed user uses the frequency band if received signal strength is equal to or greater than a predetermined value or if a DTV preamble is detected.

In addition, as next-generation communication technology, machine-to-machine (M2M) communication technology is being discussed. Even in an IEEE 802.11 WLAN system, a technical standard supporting M2M communication has been developed as IEEE 802.11ah. M2M communication means a communication scheme including one or more machines and may be referred to as machine type communication (MTC). Here, a machine means an entity which does not require direct operation or intervention of a person. For example, a device including a mobile communication module, such as a meter or a vending machine, may include a user equipment such as a smart phone which is capable of automatically accessing a network without operation/intervention of a user to perform communication. M2M communication includes communication between devices (e.g., device-to-device (D2D) communication) and communication between a device and an application server. Examples of communication between a device and a server include communication between a vending machine and a server, communication between a point of sale (POS) device and a server and communication between an electric meter, a gas meter or a water meter and a server. An M2M communication based application may include security, transportation, health care, etc. If the characteristics of such examples are considered, in general, M2M communication should support transmission and reception of a small amount of data at a low rate in an environment in which very many apparatuses are present.

More specifically, M2M communication should support a larger number of STAs. In a currently defined WLAN system, it is assumed that a maximum of 2007 STAs is associated with one AP. However, in M2M communication, methods supporting the case in which a larger number of STAs (about 6000) are associated with one AP are being discussed. In addition, in M2M communication, it is estimated that there are many applications supporting/requiring a low transfer rate. In order to appropriately support the low transfer rate, for example, in a WLAN system, the STA may recognize presence of data to be transmitted thereto based on a traffic indication map (TIM) element and methods of reducing a bitmap size of the TIM are being discussed. In addition, in M2M communication, it is estimated that there is traffic having a very long transmission/reception interval. For example, in electricity/gas/water consumption, a very small amount of data is required to be exchanged at a long period (e.g., one month). In a WLAN system, although the number of STAs associated with one AP is increased, methods of efficiently supporting the case in which the number of STAs, in which a data frame to be received from the AP is present during one beacon period, is very small are being discussed.

WLAN technology has rapidly evolved. In addition to the above-described examples, technology for direct link setup, improvement of media streaming performance, support of fast and/or large-scale initial session setup, support of extended bandwidth and operating frequency, etc. is being developed.

Medium Access Mechanism

In a WLAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF interframe space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception AP and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention free period (CFP).

Figure 6:
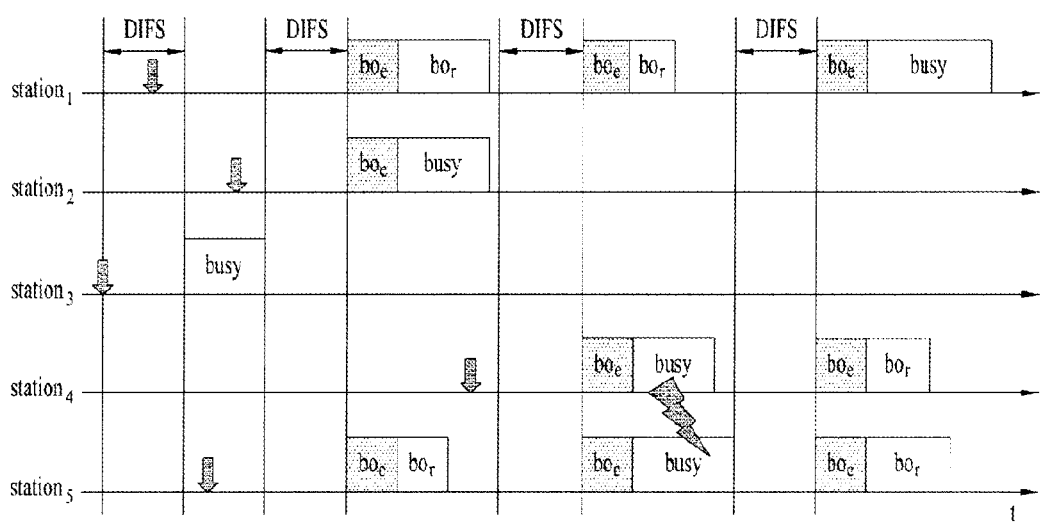
FIG. 6 is a diagram illustrating a backoff process.

FIG. 6 is a diagram illustrating a backoff process.

Operation based on a random backoff period will be described with reference to FIG. 6. If a medium is changed from an occupied or busy state to an idle state, several STAs may attempt data (or frame) transmission. At this time, a method of minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin. CW, CWmin and CWmax values are preferably set to $2^n-1$ (n=0, 1, 2, . . . ).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 6, if packets to be transmitted to the MAC of STA3 arrive, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values. In the example of FIG. 6, STA2 selects a smallest backoff count value and STA1 selects a largest backoff count value. That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state again, STA1 and STA5 wait for the DIFS and then resume countdown. That is, after the residual backoff slots corresponding to the residual backoff time are counted down, frame transmission may start. Since the residual backoff time of STA5 is less than of STA1, STA5 starts frame transmission. If STA2 occupies the medium, data to be transmitted may be generated in the STA5. At this time, STA4 may wait for the DIFS if the medium enters the idle state, perform countdown according to a random backoff count value selected thereby, and start frame transmission. In the example of FIG. 6, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a WLAN may use a network allocation vector (NAV). The NAV refers to a value of a time until a medium becomes available, which is indicated to another AP and/or STA by an AP and/or an STA, which is currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 7 and 8. Although a transmission range may not be equal to an actual carrier sensing range, for convenience, assume that the transmission range may be equal to the actual carrier sensing range.

Figure 7:
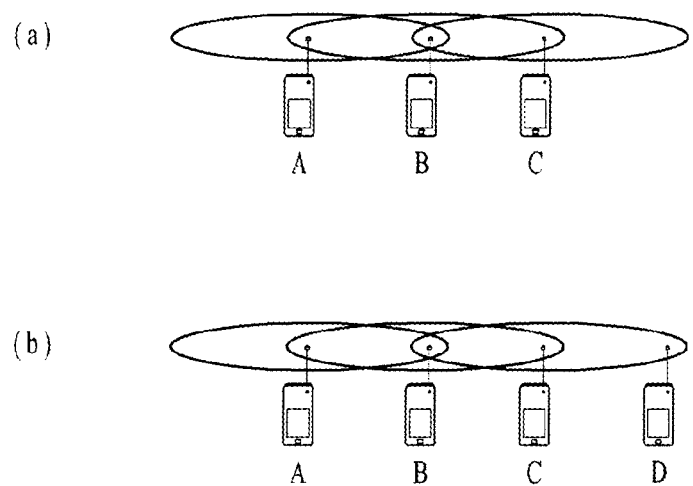
FIG. 7 is a diagram illustrating a hidden node and an exposed node.

FIG. 7 is a diagram illustrating a hidden node and an exposed node.

FIG. 7(a) shows a hidden node, and, in this case, an STA A and an STA B are performing communication and an STA C has information to be transmitted. More specifically, although the STA A transmits information to the STA B, the STA C may determine that the medium is in the idle state, when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be the hidden node of the STA C.

FIG. 7(b) shows an exposed node and, in this case, the STA B transmits data to the STA A and the STA C has information to be transmitted to the STA D. In this case, if the STA C performs carrier sensing, it may be determined that the medium is busy due to transmission of the STA B. If the STA C has information to be transmitted to the STA D, since it is sensed that the medium is busy, the STA C waits until the medium enters the idle state. However, since the STA A is actually outside the transmission range of the STA C, transmission from the STA C and transmission from the STA B may not collide from the viewpoint of the STA A. Therefore, the STA C unnecessarily waits until transmission of the STA B is stopped. At this time, the STA C may be the exposed node of the STA B.

Figure 8:
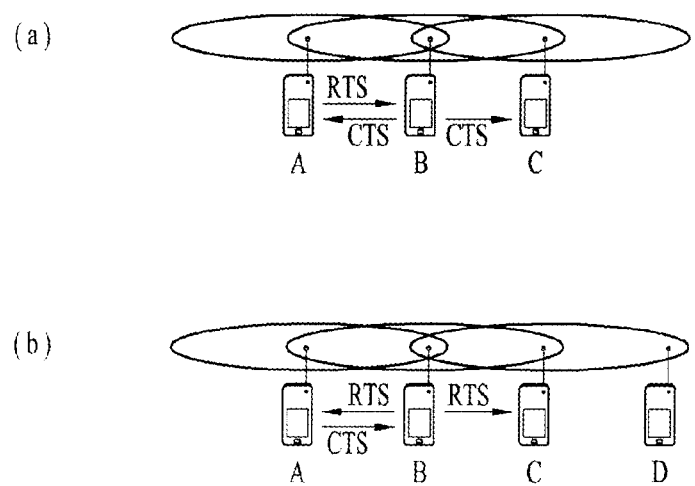
FIG. 8 is a diagram illustrating request to send (RTS) and clear to send (CTS)

FIG. 8 is a diagram illustrating request to send (RTS) and clear to send (CTS).

In the example of FIG. 7, in order to efficiently use a collision avoidance mechanism, short signaling packet such as RTS and CTS may be used. RST/CTS between two STAs may be enabled to be overheard by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

FIG. 8(a) shows a method of solving a hidden node problem. Assume that both the STA A and the STA C attempt to transmit data to the STA B. If the STA A transmits the RTS to the STA B, the STA B transmits the CTS to the peripheral STA A and C. As a result, the STA C waits until data transmission of the STA A and the STA B is finished, thereby avoiding collision.

FIG. 8(b) shows a method of solving an exposed node problem. The STA C may overhear RTS/CTS transmission between the STA A and the STA B and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS of the STA A, it can be confirmed that the STA A is outside carrier sensing of the STA C.

Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, in a WLAN system, a power management (PM) mode of the STA is supported.

The PM mode of the STA is divided into an active mode and a power save (PS) mode. The STA fundamentally operates in an active mode. The STA which operates in the active mode is maintained in an awake state. The awake state refers to a state in which normal operation such as frame transmission and reception or channel scanning is possible. The STA which operates in the PS mode operates while switching between a sleep state or an awake state. The STA which operates in the sleep state operates with minimum power and does not perform frame transmission and reception or channel scanning.

Since power consumption is reduced as the sleep state of the STA is increased, the operation period of the STA is increased. However, since frame transmission and reception is impossible in the sleep state, the STA may not unconditionally operate in the sleep state. If a frame to be transmitted from the STA, which operates in the sleep state, to the AP is present, the STA may be switched to the awake state to transmit the frame. If a frame to be transmitted from the AP to the STA is present, the STA in the sleep state may not receive the frame and may not confirm that the frame to be received is present. Accordingly, the STA needs to perform an operation for switching to the awake state according to a specific period in order to confirm presence of the frame to be transmitted thereto (to receive the frame if the frame to be transmitted is present).

Figure 9:
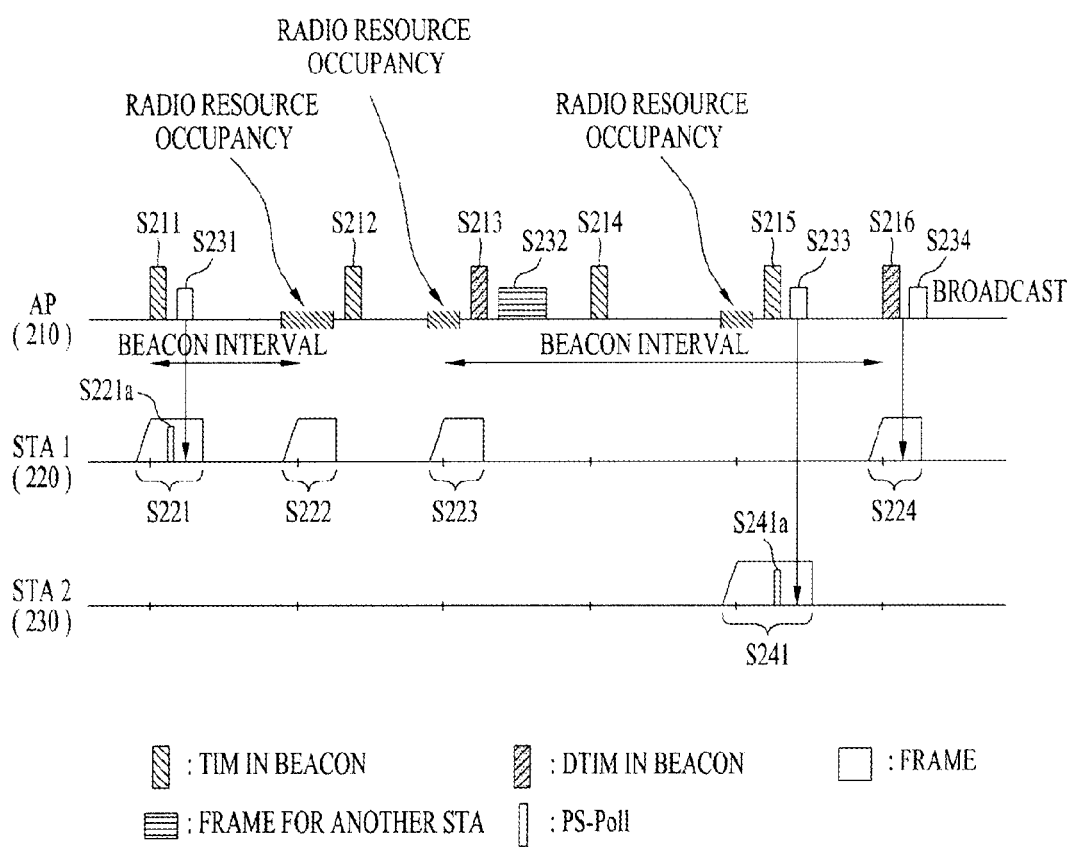
FIG. 9 is a diagram illustrating power management operation.

FIG. 9 is a diagram illustrating power management operation.

Referring to FIG. 9, an AP 210 transmits beacon frames to STAs within a BSS at a predetermined period (S211, S212, S213, S214, S215 and S216). The beacon frame includes a traffic indication map (TIM) information element. The TIM information element includes information indicating that buffered traffic for STAs associated with the AP 210 is present and the AP 210 will transmit a frame. The TIM element includes a TIM used to indicate a unicast frame or a delivery traffic indication map (DTIM) used to indicate a multicast or broadcast frame.

The AP 210 may transmit the DTIM once whenever the beacon frame is transmitted three times. An STA1 220 and an STA2 222 operate in the PS mode. The STA1 220 and the STA2 222 may be switched from the sleep state to the awake state at a predetermined wakeup interval to receive a TIM element transmitted by the AP 210. Each STA may compute a time to switch to the awake state based on a local clock thereof. In the example of FIG. 9, assume that the clock of the STA matches the clock of the AP.

For example, the predetermined awake interval may be set such that the STA1 220 is switched to the awake state every beacon interval to receive a TIM element. Accordingly, the STA1 220 may be switched to the awake state (S211) when the AP 210 first transmits the beacon frame (S211). The STA1 220 may receive the beacon frame and acquire the TIM element. If the acquired TIM element indicates that a frame to be transmitted to the STA1 220 is present, the STA1 220 may transmit, to the AP 210, a power save-Poll (PS-Poll) frame for requesting frame transmission from the AP 210 (S221a). The AP 210 may transmit the frame to the STA1 220 in correspondence with the PS-Poll frame (S231). The STA1 220 which completes frame reception is switched to the sleep state.

When the AP 210 secondly transmits the beacon frame, since another device access the medium and thus the medium is busy, the AP 210 may not transmit the beacon frame at an accurate beacon interval and may transmit the beacon frame at a delayed time (S212). In this case, the operation mode of the STA1 220 is switched to the awake state according to the beacon interval but the delayed beacon frame is not received. Therefore, the operation mode of the STA1 220 is switched to the sleep state again (S222).

When the AP 210 thirdly transmits the beacon frame, the beacon frame may include a TIM element set to a DTIM. Since the medium is busy, the AP 210 transmits the beacon frame at a delayed time (S213). The STA1 220 is switched to the awake state according to the beacon interval and may acquire the DTIM via the beacon frame transmitted by the AP 210. Assume that the DTIM acquired by the STA1 220 indicates that a frame to be transmitted to the STA1 220 is not present and a frame for another STA is present. In this case, the STA1 220 may confirm that a frame transmitted thereby is not present and may be switched to the sleep state again. The AP 210 transmits the beacon frame and then transmits the frame to the STA (S232).

The AP 210 fourthly transmits the beacon frame (S214). Since the STA1 220 cannot acquire information indicating that buffered traffic therefor is present via reception of the TIM element twice, the wakeup interval for receiving the TIM element may be controlled. Alternatively, if signaling information for controlling the wakeup interval of the STA1 220 is included in the beacon frame transmitted by the AP 210, the wakeup interval value of the STA1 220 may be controlled. In the present example, the STA1 220 may change switching of the operation state for receiving the TIM element every beacon interval to switching of the operation state every three beacon intervals. Accordingly, since the STA1 220 is maintained in the sleep state when the AP 210 transmits the fourth beacon frame (S214) and transmits the fifth beacon frame (S215), the TIM element cannot be acquired.

When the AP 210 sixthly transmits the beacon frame (S216), the STA1 220 may be switched to the awake state to acquire the TIM element included in the beacon frame (S224). Since the TIM element is a DTIM indicating that a broadcast frame is present, the STA1 220 may not transmit the PS-Poll frame to the AP 210 but may receive a broadcast frame transmitted by the AP 210 (S234). The wakeup interval set in the STA2 230 may be set to be greater than that of the STA1 220. Accordingly, the STA2 230 may be switched to the awake state to receive the TIM element (S241), when the AP 210 fifthly transmits the beacon frame (S215). The STA2 230 may confirm that a frame to be transmitted thereto is present via the TIM element and transmits the PS-Poll frame to the AP 210 (S241a) in order to request frame transmission. The AP 210 may transmit the frame to the STA2 230 in correspondence with the PS-Poll frame (S233).

For PM management shown in FIG. 9, a TIM element includes a TIM indicating whether a frame to be transmitted to an STA is present and a DTIM indicating whether a broadcast/multicast frame is present. The DTIM may be implemented by setting a field of the TIM element.

Figure 10:
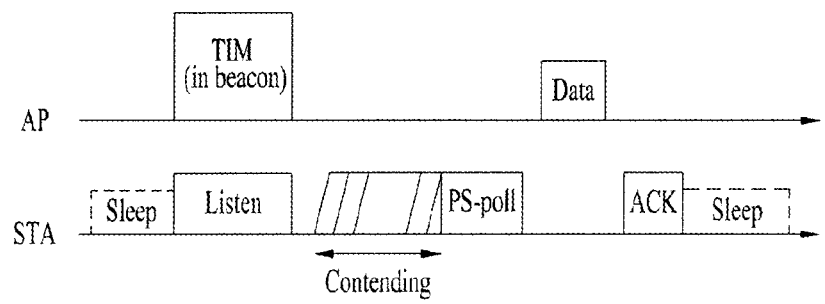
FIGS. 10 to 12 are diagram illustrating operation of a station (STA) which receives a TIM.
Figure 11:
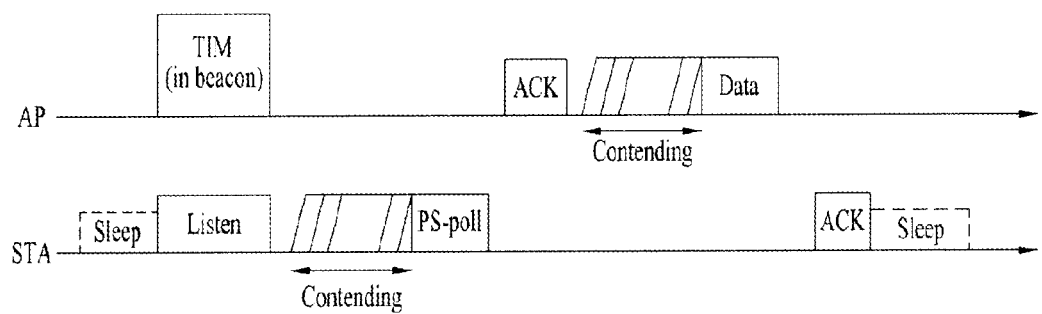
Figure 12:
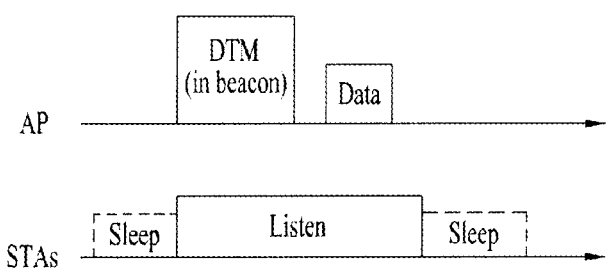

FIGS. 10 to 12 are diagrams illustrating operation of a station (STA) which receives a traffic indication map (TIM).

Referring to FIG. 10, an STA may be switched from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP which receives the PS-Poll frame transmitted by the STA may transmit the frame to the STA. The STA may receive the data frame and transmit an ACK frame to the AP. Thereafter, the STA may be switched to the sleep state again.

As shown in FIG. 10, the AP may receive the PS-Poll frame from the STA and then operate according to an immediate response method for transmitting a data frame after a predetermined time (e.g., a short inter-frame space (SIFS)). If the AP does not prepare a data frame to be transmitted to the STA during the SIFS after receiving the PS-Poll frame, the AP may operate according to a deferred response method, which will be described with reference to FIG. 11.

In the example of FIG. 11, operation for switching the STA from the sleep state to the awake state, receiving a TIM from the AP, contending and transmitting a PS-Poll frame to the AP is equal to that of FIG. 10. If the data frame is not prepared during the SIFS even when the AP receives the PS-Poll frame, the data frame is not transmitted but an ACK frame may be transmitted to the STA. If the data frame is prepared after transmitting the ACK frame, the AP may contend and transmit the data frame to the STA. The STA may transmit the ACK frame indicating that the data frame has been successfully received to the AP and may be switched to the sleep state.

FIG. 12 shows an example in which the AP transmits the DTIM. The STAs may be switched from the sleep state to the awake state in order to receive the beacon frame including the DTIM element from the AP. The STA may confirm that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may be switched to the sleep state again after completing data reception.

TIM Structure

In the PM mode management method based on the TIM (or DTIM) protocol described with reference to FIGS. 9 to 12, the STAs may confirm whether a data frame to be transmitted thereto is present via STA identification included in the TIM element. The STA identification may be related to an association identifier (AID) assigned to the STA upon association with the AP.

The AID is used as a unique identifier for each STA within one BSS. For example, in a current WLAN system, the AID may be one of values of 1 to 2007. In a currently defined WLAN system, 14 bits are assigned to the AID in a frame transmitted by the AP and/or the STA. Although up to 16383 may be assigned as the AID value, 2008 to 16383 may be reserved.

The TIM element according to an existing definition is not appropriately applied to an M2M application in which a large number (e.g., more than 2007) of STAs is associated with one AP. If the existing TIM structure extends without change, the size of the TIM bitmap is too large to be supported in an existing frame format and to be suitable for M2M communication considering an application with a low transfer rate. In addition, in M2M communication, it is predicted that the number of STAs, in which a reception data frame is present during one beacon period, is very small. Accordingly, in M2M communication, since the size of the TIM bitmap is increased but most bits have a value of 0, there is a need for technology for efficiently compressing the bitmap.

As an existing bitmap compression technology, a method of omitting 0 which continuously appears at a front part of a bitmap and defining an offset (or a start point) is provided. However, if the number of STAs in which a buffered frame is present is small but a difference between the AID values of the STAs is large, compression efficiency is bad. For example, if only frames to be transmitted to only two STAs respectively having AID values of 10 and 2000 are buffered, the length of the compressed bitmap is 1990 but all bits other than both ends have a value of 0. If the number of STAs which may be associated with one AP is small, bitmap compression inefficiency is not problematic but, if the number of STAs is increased, bitmap compression inefficiency deteriorates overall system performance.

As a method of solving this problem, AIDs may be divided into several groups to more efficiently perform data transmission. A specific group ID (GID) is assigned to each group. AIDs assigned based on the group will be described with reference to FIG. 13.

FIG. 13(a) shows an example of AIDs assigned based on a group. In the example of FIG. 13(a), several bits of a front part of the AID bitmap may be used to indicate the GID. For example, four DIDs may be expressed by the first two bits of the AID of the AID bitmap. If the total length of the AID bitmap is N bits, the first two bits (B1 and B2) indicate the GID of the AID.

FIG. 13(a) shows another example of AIDs assigned based on a group. In the example of FIG. 13(b), the GID may be assigned according to the location of the AID. At this time, the AIDs using the same GID may be expressed by an offset and a length value. For example, if GID 1 is expressed by an offset A and a length B, this means that AIDs of A to A+B−1 on the bitmap have GID 1. For example, in the example of FIG. 13(b), assume that all AIDs of 1 to N4 are divided into four groups. In this case, AIDs belonging to GID 1 are 1 to N1 and may be expressed by an offset 1 and a length N1. AIDs belonging to GID2 may be expressed by an offset N1+1 and a length N2−N1+1, AIDs belonging to GID 3 may be expressed by an offset N2+1 and a length N3−N2+1, and AIDs belonging to GID 4 may be expressed by an offset N3+1 and a length N4−N3+1.

If the AIDs assigned based on the group are introduced, channel access is allowed at a time interval which is changed according to the GID to solve lack of TIM elements for a large number of STAs and to efficiently perform data transmission and reception. For example, only channel access of STA(s) corresponding to a specific group may be granted during a specific time interval and channel access of the remaining STA(s) may be restricted. A predetermined time interval at which only access of specific STA(s) is granted may also be referred to as a restricted access window (RAW).

Channel access according to GID will be described with reference to FIG. 13(c). FIG. 13(c) shows a channel access mechanism according to a beacon interval if the AIDs are divided into three groups. At a first beacon interval (or a first RAW), channel access of STAs belonging to GID 1 is granted but channel access of STAs belonging to other GIDs is not granted. For such implementation, the first beacon includes a TIM element for AIDs corresponding to GID 1. A second beacon frame includes a TIM element for AIDs corresponding to GID 2 and thus only channel access of the STAs corresponding to the AIDs belonging to GID 2 is granted during the second beacon interval (or the second RAW). A third beacon frame includes a TIM element for AIDs corresponding to GID 3 and thus only channel access of the STAs corresponding to the AIDs belonging to GID 3 is granted during the third beacon interval (or the third RAW). A fourth beacon frame includes a TIM element for AIDs corresponding to GID 1 and thus only channel access of the STAs corresponding to the AIDs belonging to GID 1 is granted during the fourth beacon interval (or the fourth RAW). Only channel access of the STAs corresponding to a specific group indicated by the TIM included in the beacon frame may be granted even in fifth and subsequent beacon intervals (or fifth and subsequent RAWs).

Although the order of GIDs allowed according to the beacon interval is cyclic or periodic in FIG. 13(c), the present invention is not limited thereto. That is, by including only AID(s) belonging to specific GID(s) in the TIM elements, only channel access of STA(s) corresponding to the specific AID(s) may be granted during a specific time interval (e.g., a specific RAW) and channel access of the remaining STA(s) may not be granted.

Figure 13:
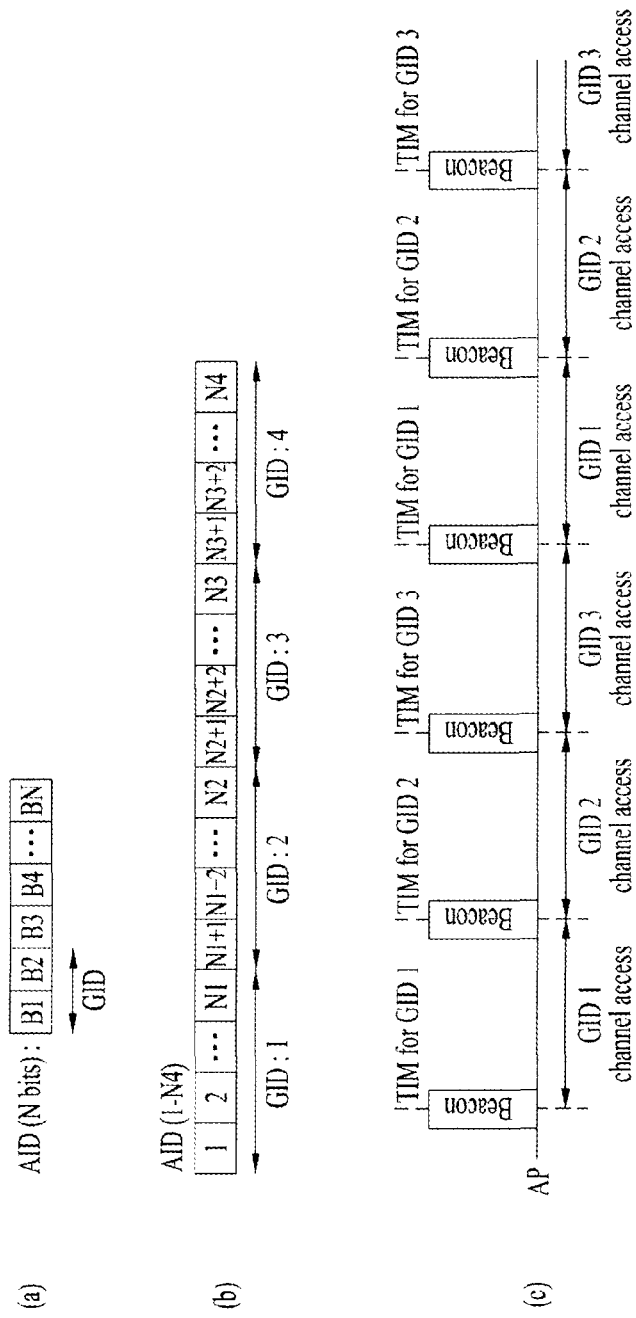
FIG. 13 is a diagram illustrating a group based association ID (AID)

The above-described group based AID assignment method may also be referred to as a hierarchical structure of a TIM. That is, an entire AID space may be divided into a plurality of blocks and only channel access of STA(s) corresponding to a specific block having a non-zero value (that is, STAs of a specific group) may be granted. A TIM having a large size is divided into small blocks/groups such that the STA easily maintains TIM information and easily manages blocks/groups according to class, QoS or usage of the STA. Although a 2-level layer is shown in the example of FIG. 13, a TIM of a hierarchical structure having two or more levels may be constructed. For example, the entire AID space may be divided into a plurality of page groups, each page group may be divided into a plurality of blocks, and each block may be divided into a plurality of sub-blocks. In this case, as an extension of the example of FIG. 13(a), the first N1 bits of the AID bitmap indicate a paging ID (that is, a PID), the next N2 bits indicate a block ID, the next N3 bits indicate a sub-block ID, and the remaining bits indicate the STA bit location in the sub-block.

In the following examples of the present invention, various methods of dividing and managing STAs (or AIDs assigned to the STAs) on a predetermined hierarchical group basis are applied and the group based AID assignment method is not limited to the above examples.

PPDU Frame Format

The format of physical layer convergence protocol (PLCP) packet data unit (PPDU) frame includes a short training field (STF), a long training field (LTF), a signal (SIG) field and a data field. The simplest (e.g., non-high throughput (non-HT)) PPDU frame format may include a legacy-STF (L-STF), a legacy-LTF (L-LTF), an SIG field, and a data field only. In addition, the format may include additional (or different types of) STF, LTF, and SIG field between an SIG field and a data field according to a type of PPDU frame format (e.g., HT-mixed format PPDU, HT-greenfield format PPDU, very high throughput (VHT) PPDU, etc.).

The STF is a signal for signal detection, automatic gain control (AGC), diversity selection, minute time synchronization, etc. and the LTF is a signal for channel estimation, frequency error estimation, etc. A combination of the STF and the LTF may be referred to as a PCLP preamble which may be a signal for synchronization of an OFDM physical layer and channel estimation.

The SIG field may include a RATE field, a LENGTH field, etc. The RATE field may information about data modulation and coding rate. The LENGTH field may include information about a date length. In addition, the SIG field may include a parity bit, a SIG TAIL bit, etc.

The data field may include a SERVICE field, a PLCP service data unit (PSDU), and a PPDU TAIL bit and include a padding bit as necessary. A partial bit of the SERVICE field may be used for synchronization of a descrambler of a receiving end. The PSDU may correspond to a MAC PDU defined in a MAC layer and include data that is generated/used in a higher layer. The PPDU TAIL bit may be used to return a state of an encoder to 0. The padding bit may be used to match a length of the data field in a predetermined unit.

The MAC PDU may be defined according to various MAC frame formats and a basic MAC frame includes a MAC header, a frame body, and a frame check sequence (FCS). The MAC frame may include a MAC PDU and may be transmitted/received through a PSDU of a data region of the PPDU frame format.

Meanwhile, the format of a null-data packet (NDP) frame refers to the format of a frame that does not include a data packet. That is, the NDP frame refers to frame format that includes only a PLCP header portion (i.e., STF, LTF, and SIC fields) of general PPDU format and does not include the remaining portion (i.e., a data field). The NDP frame may be referred to as short frame format.

Short Beacon

A general beacon frame may be composed of a MAC header, a frame body, and an FCS. The frame body may include the following fields.

A timestamp field may be for synchronization. All STAs that receive a beacon frame may change/update a local clock thereof according to a timestamp value.

A beacon interval field indicates a time interval of beacon transmission and is represented in units of time units (TUs). A TU may include a unit of microsecond (μs) and, for example, may be defined as 1024 μs. A point of time for transmission of a beacon by an AP may be represented as target beacon transmission time (TBTT). That is, the beacon interval field corresponds to a time interval from one transmission time of one beacon frame to next TBTT. An STA that receives a previous beacon may calculate a point of time for transmission of a next beacon from the beacon interval field. In general, a beacon interval may be set as 100 TU.

A capability information field includes information about capability of device/network. For example, network type such as ad-hoc, an infrastructure network, or the like may be indicated through the capability information field. In addition, the capability information field may be used to indicate details of whether polling is supported, encryption, etc.

In addition, SSID, supported rates, a frequency hopping (FH) parameter set, a direct sequence spread spectrum (DSSS) parameter set, a contention free (CF) parameter set, an IBSS parameter set, TIM, country IE, power constraint, QoS capability, high-throughput (HT) capability, etc. However, the field/information included in the beacon frame is exemplary, and the beacon frame stated in the present invention is not limited to the above examples.

Unlike the aforementioned general beacon frame, a short beacon frame may be defined. In order to distinguish the short beacon frame from the general conventional beacon, a general conventional beacon may be referred to as a short full beacon.

Figure 14:
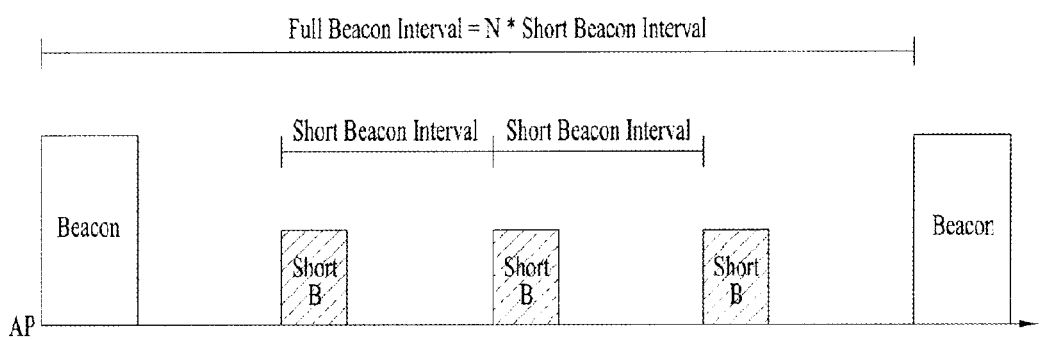
FIG. 14 is a diagram for explanation of a short beacon.

FIG. 14 is a diagram for explanation of a short beacon.

A short beacon interval may be represented in units of TUs and a beacon interval (i.e., a beacon interval of a full beacon) may be defined as an integer multiple of the short beacon interval. As illustrated in FIG. 14, Full Beacon Interval=N*Short Beacon Interval may be defined (here, N≥1). For example, a short beacon may be transmitted once Or more between time when a full beacon is transmitted once and time when a next full beacon is transmitted. FIG. 14 illustrates an example in which Short B is transmitted three times during a full beacon interval.

A STA may determine whether a network being searched by the STA is available, using an SSID (or a compressed SSID) included in a short beacon. The STA may transmit association request to a MAC address of an AP included in the short beacon transmitted by a network desired by the STA. In general, a short beacon is more frequently transmitted than a full beacon and thus a non-associated STA can be rapidly associated by supporting the short beacon. When an STA requires additional information for being associated, the STA may transmit a probe request to a desired AP. In addition, the STA may perform synchronization using timestamp included in the short beacon. Moreover, the STA may signal whether system information (or network information, and hereinafter, system/network information is collectively referred to as "system information") is changed through the short beacon. When the system information is changed, the STA may acquire the changed system information through a full beacon. In addition, the short beacon may include TIM. That is, the TIM may be provided through the full beacon or provided through the short beacon.

Figure 15:
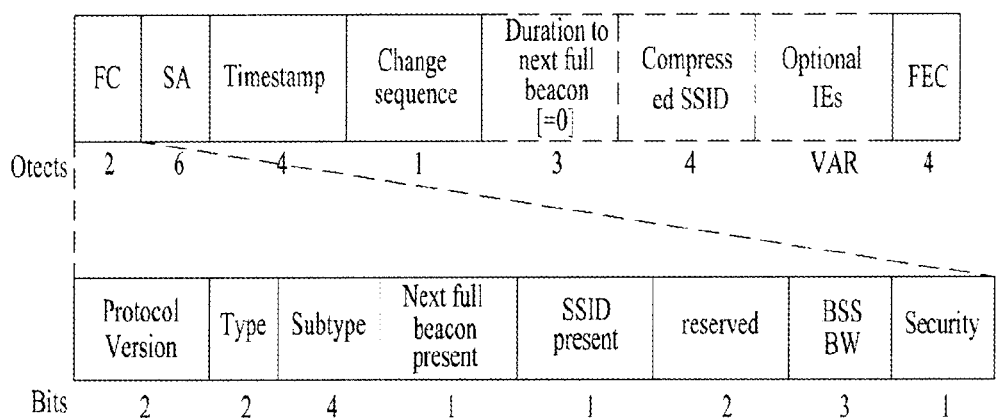
FIG. 15 is a diagram for explanation of exemplary fields included in a short beacon frame.

FIG. 15 is a diagram for explanation of exemplary fields included in a short beacon frame.

A frame control (FC) field may include protocol version, type, subtype, next full beacon present, SSID present, BSS bandwidth (BSS BW), and security fields. The FC may have octet length 2.

Among subfields of the FC field, a protocol version field may be defined as a bit length 2 and may be basically configured as 0. The type field and the subtype field may be defined as bit lengths 2 and 4, respectively, and the type field and the subtype field may indicate a function of a corresponding frame together (e.g., which may indicate that a corresponding frame is a short beacon frame). The next full beacon present may be defined as bit length 1 and configured as a value indicating whether a short beacon frame includes a 'duration to next full beacon' field (or information about next TBTT). An 'SSID present' field may be defined as bit length 1 and configured as a value indicating whether a short beacon frame includes a 'compressed SSID' field. The BSS BW field may be defined as bit length 3 and configured as a value indicating a current operation bandwidth of BSS (e.g., 1, 2, 4, 8, or 16 MHz). The security field may be defined as bit length 1 and configured as a value indicating whether an AP is an RSNA AP. The remaining bits (e.g., 2 bits) may be reserved.

Then a source address (SA) field of the short beacon frame may be a MAC address of an AP that transmits a short beacon. The SA may have octet length 6.

The timestamp field may include least significant bit (LSB) 4 byte (i.e., 4 octets) of a timestamp of the AP. This is because, even if only LSB 4 byte instead of an entire timestamp is provided, an STA (e.g., an associated STA) that has received a value of the entire timestamp is sufficient to perform synchronization using the LSB 4 byte value.

A change sequence field may include information indicating whether system information is changed. In detail, when critical information (e.g., full beacon information) of a network is changed, a change sequence counter is increased by 1. This field is defined as octet length 1.

The 'duration to next full beacon' field may or may not be included in a short beacon. This field may signal time length to time for transmission of a next full beacon from time for transmission of a corresponding short beacon to a STA. Thus the STA that listens to the short beacon may operate to a next full beacon in a dos (or sleep) mode, t hereby reducing power consumption. In addition, the 'duration to next full beacon' field may include information indicating next TBTT. A length of this field may be defined as, for example, 3 octets.

The 'compressed SSID' field may or may not be included in a short beacon. This field may include a portion of an SSID of a network or a hashing value of the SSID. An STA that already knows the corresponding network may be permitted to discover the corresponding network using the SSID. A length of this field may be defined as, for example, 4 octets.

The short beacon frame may include an additional or optional field or information elements (IEs) in addition to the above exemplary fields.

A forward error correction (FEC) field may be used to examine whether error occurs in the short beacon frame and configured as an FCS field. This field may be defined as octet length 4.

Improved System Information Updating Method

In a conventional wireless local area network (LAN) environment, an AP operates via a method for periodically transmitting a full beacon frame including system information. However, in an enhanced wireless LAN environment, an AP may operate via a method in which a full beacon frame including system information is not periodically transmitted. For example, in an environment such as a home LAN, etc., when an associated STA is not present, an AP may operate via a method in which a beacon is not transmitted. In addition, even if a full beacon frame is periodically transmitted, a 'duration to next full beacon' field may not be included in a short beacon in order to reduce overhead of a short beacon. In this case, the AP may configure a value of a 'next full beacon present' field in an FC field of a short beacon frame as 0 and transmit a short beacon that does not include the 'duration to next full beacon' field.

In this case, when the AP does not notify an STA that a full beacon is not transmitted, the STA may continuously and repeatedly attempt to and fail to receive a full beacon, thereby increasing power consumption of the STA. In addition, when information about a point of time when a next full beacon can be received is not included in a short beacon, even if the STA receives the short beacon, the STA may continuously attempt to receive a full beacon until the full beacon is actually transmitted, thereby increasing power consumption. Accordingly, when the AP quickly notifies the STA that the AP does not transmit the full beacon or that a next full beacon is not periodically transmitted, power consumption of the STA can be reduced.

In addition, when the STA determines that the AP does not transmit a full beacon, the corresponding STA may obtain system information via a probe request/response operation without waiting for a full beacon and may effectively perform an operation for association with the corresponding AP. For example, when an AP that receives a probe request frame from an STA may transmit a probe response frame including system information (e.g., an SSID, a supported rate, an FH parameter set, a DSSS parameter set, a CF parameter set, an IBSS parameter set, a country IE, etc.) to the corresponding STA in response to the probe request frame. Thus the STA can be associated with the corresponding AP by obtaining the system information provided through the probe response frame and performing association request/response.

In a conventional wireless LAN operation, since a full beacon including system information is periodically transmitted, when the system information is changed, an STA may obtain the changed system information by receiving a next beacon. However, in an environment in which a full beacon including system information is not periodically transmitted, an STA may not accurately obtain the changed system information at an appropriate point of time. In this case, the STA cannot accurately operate in a corresponding wireless LAN network.

The present invention proposes a method for accurately obtaining changed information and maintaining updated system information by an STA in a system in which an AP does not periodically transmit a full beacon frame (i.e., a frame including system information).

Embodiment 1

Embodiment 1 relates to a method for notifying an STA of whether an AP periodically transmits a full beacon frame including system information.

For example, information indicating whether a full beacon may be periodically transmitted is included in a short beacon frame and may be signaled to the STA.

Figure 16:
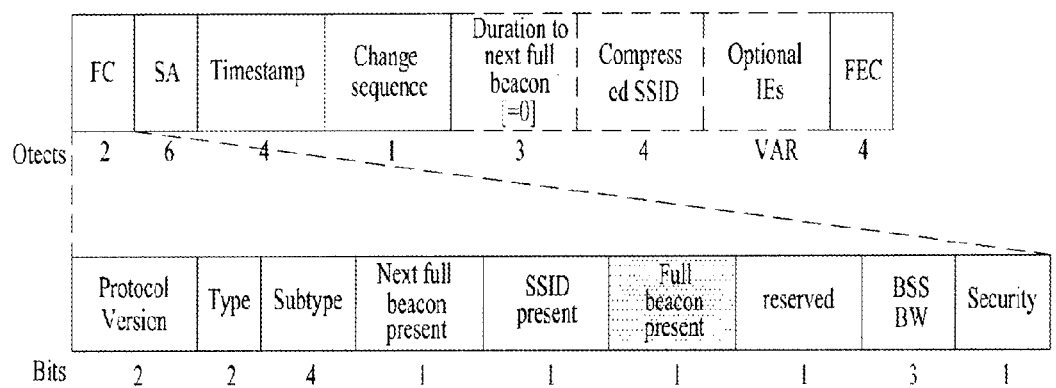
FIG. 16 is a diagram illustrating the format of a short beacon frame according to an example of the present invention.

FIG. 16 is a diagram illustrating the format of a short beacon frame according to an example of the present invention.

As illustrated in FIG. 16, a 'full beacon present' subfield in an FC field of a short beacon frame may be defined. A 'full beacon present' field may be configured as a value indicating whether a periodically transmitted full beacon is present. For example, when an AP transmits a full beacon (or when the AP periodically transmits a full beacon), a value of the 'full beacon present' field may be configured as 1. When a value of the 'full beacon present' field may be configured as 0, this means that the AP does not transmit a full beacon (or the AP does not periodically transmit a full beacon). When a value of the 'full beacon present' field is configured as 0, the 'full beacon present' subfield in the FC field of a short beacon may also be configured as a value (e.g., 0) indicating that a 'duration to next full beacon' field is not present in the short field.

Figure 17:
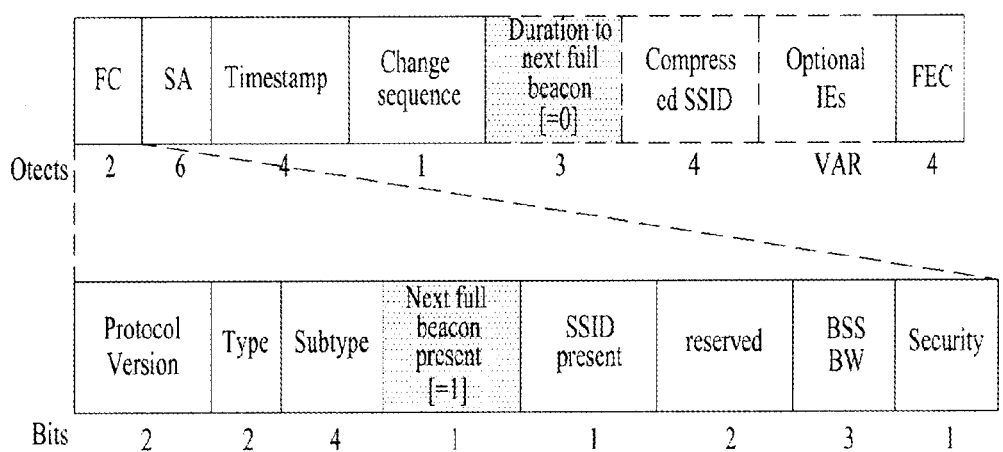
FIG. 17 is a diagram illustrating the format of a short beacon frame according to another example of the present invention.

FIG. 17 is a diagram illustrating the format of a short beacon frame according to another example of the present invention.

As illustrated in FIG. 17, when a value of a 'next full beacon present' in an FC field of a short beacon is configured as 1 and simultaneously a 'duration to next full beacon' field has a predetermined value (e.g., when all bits are configured as 0 or all bits are configured as 1), this may indicate that a full beacon is not transmitted (or the full beacon is not periodically transmitted). Unlike in the example of FIG. 16 in which an explicit field indicating whether a full beacon is present is additionally defined, the example of FIG. 17 may correspond to a method of implicitly indicating non-presence of a full beacon when values of legacy fields constitute a specific combination.

In the example of FIG. 17, when a value of the 'duration to next full beacon' is configured as 0, an AP does not transmit a full beacon. In this case, even if the AP does not transmit a full beacon, the 'duration to next full beacon' field needs always to be included in a short beacon frame.

Embodiment 2

Embodiment 2 relates to operations of an AP and an STA according to whether a full beacon is transmitted.

Figure 18:
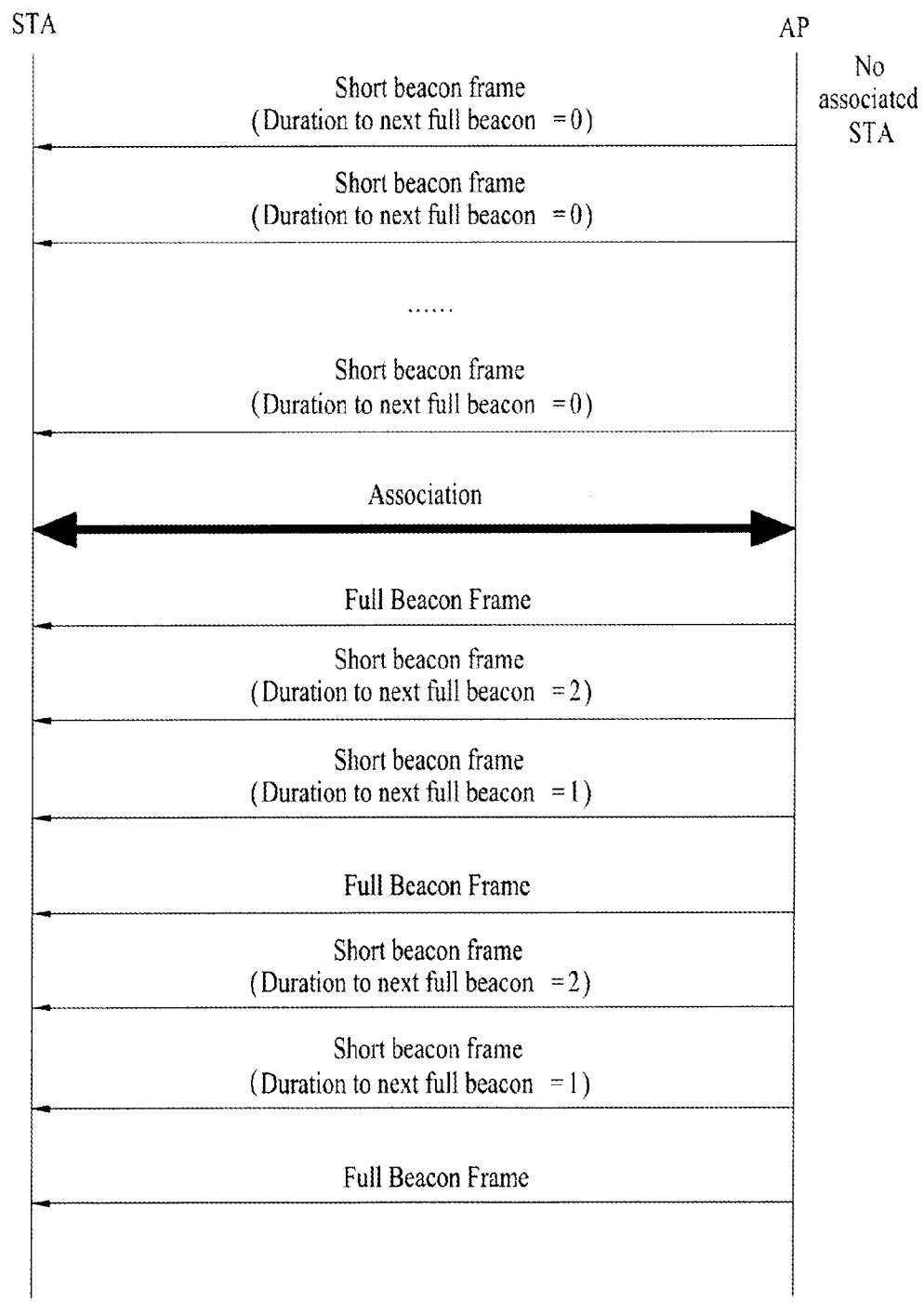
FIG. 18 is a diagram for explanation of a method for transmitting and receiving a full beacon frame according to an example of the present invention.

FIG. 18 is a diagram for explanation of a method for transmitting and receiving a full beacon frame according to an example of the present invention.

An AP may not transmit a full beacon when an STA that is associated with the AP is not present. In this case, the AP may notify an STA that the full beacon is not transmitted through a specific field of a short beacon (e.g., by configuring a value of a 'duration to next full beacon' field as 0 as in FIG. 17).

Then when the STA that is associated with the AP is present, the corresponding AP begins to also transmit a full beacon. In this case, a value of the 'duration to next full beacon' field of a short beacon frame may be configured as a value (e.g., a value that is not 0) indicating a point of time for transmission of a next full beacon, and an STA that receives the short beacon may determine a point of time for reception of a next full beacon.

As in the example of FIG. 16, when the AP does not transmit a full beacon, the 'duration to next full beacon' field is not included in a short beacon frame, and a value of a 'next full beacon present' field may be configured as 0. An STA that receives the short beacon frame may determine that a full beacon is not transmitted and thus perform active scanning without being on standby to receive a full beacon. In addition, the STA that determines that a full beacon is not transmitted from information contained in the short beacon may be on standby for a predetermined period of time (e.g., 100 ms (i.e., a default beacon interval)) from a point of time for reception of the short beacon and then may perform active scanning when the STA does not receive a full beacon for the predetermined period of time.

The STA may transmit a probe request frame to the AP via active scanning and receive a probe response frame from the AP in response to the probe request frame to obtain system information included in the probe response frame. In addition, the probe response frame may include information indicating whether system information is changed (e.g., change sequence (or version) information).

Figure 19:
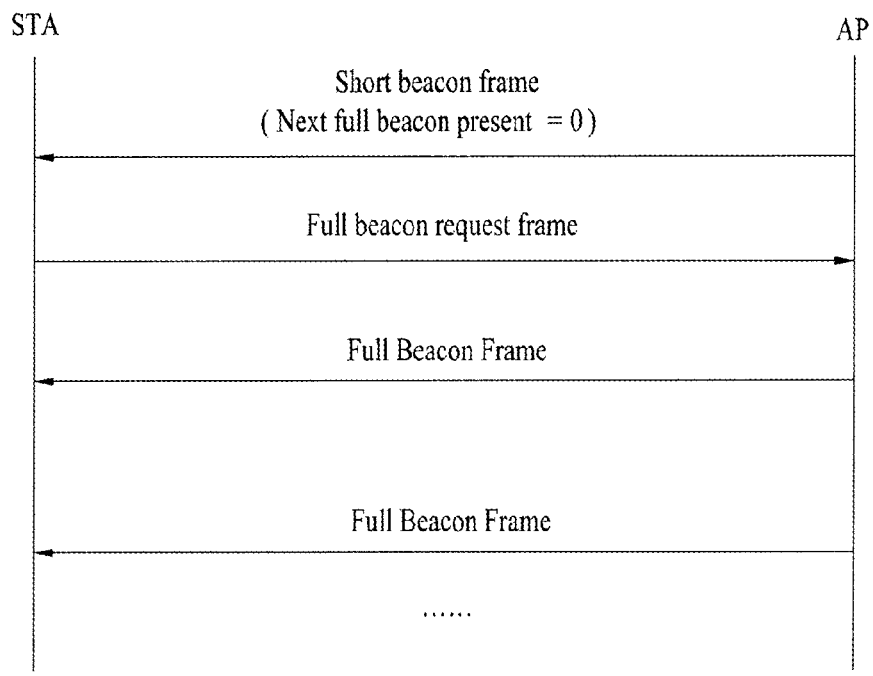
FIG. 19 is a diagram for explanation of a method for transmitting and receiving a full beacon frame according to another example of the present invention.

FIG. 19 is a diagram for explanation of a method for transmitting and receiving a full beacon frame according to another example of the present invention.

When an STA determines that an AP does not transmit a full beacon frame from information contained in a short beacon frame (e.g., as in the example of FIG. 16 or 17), the STA may request the AP to transmit the full beacon frame.

To this end, the STA may transmit a full beacon request frame to the AP. The AP that receives the full beacon request frame may begin to transmit a full beacon frame in response to the full beacon request frame.

For example, the AP may receive the full beacon request frame from the STA and then may periodically transmit the full beacon frame for a predetermined period of time or by as much as a predetermined number of times. The predetermined period of time/number of times may be configured according to a value requested by the STA or configured based on a pre-configured value according to system characteristics.

Figure 20:
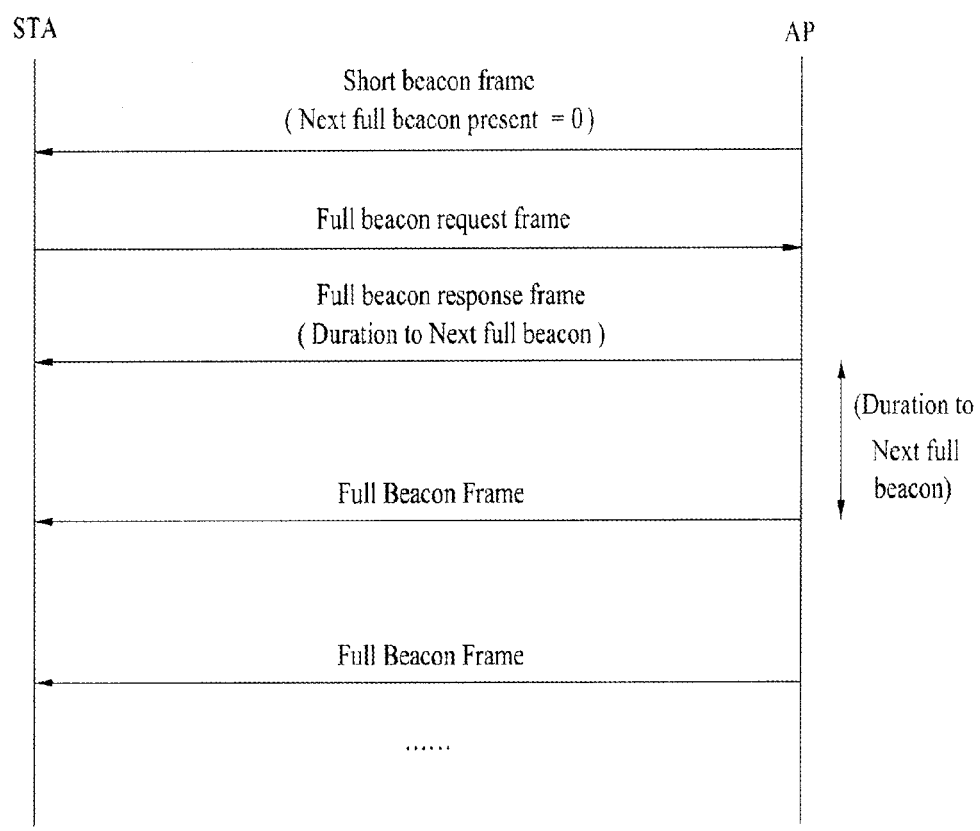
FIG. 20 is a diagram for explanation of a method for transmitting and receiving a full beacon frame according to another example of the present invention.

FIG. 20 is a diagram for explanation of a method for transmitting and receiving a full beacon frame according to another example of the present invention.

As described with reference to FIG. 18, when the AP that receives the full beacon request frame from the STA cannot immediately begin to transmit a full beacon frame, the AP may transmit a full beacon response frame to the STA. The full beacon response frame may include information for determination of a point of time for transmission of a next full beacon by the STA (e.g., a 'duration to next full beacon' field or a next TBTT field). Thus the STA may determine a point of time for reception of a next full beacon.

Although FIGS. 19 and 20 illustrate the example in which the STA transmits a full beacon request frame to the AP in order to request the AP for a full beacon, this operation may be performed through a conventional probe request frame. That is, the STA that determines that the AP does not transmit a full beacon may transmit a probe request frame to the AP to request the AP to transmit a full beacon. To this end, the probe request frame may include information indicating that that STA requests transmission of a full beacon frame. The AP that receives the probe request frame including this information may transmit a full beacon frame to the STA. Alternatively, when the AP cannot immediately transmit the full beacon frame, the AP may transmit a probe response frame to provide information for determination of a point of time for reception of a next full beacon by the STA to the corresponding STA.

In short, the STA that determines that the AP does not transmit a full beacon frame may transmit a full beacon request frame/probe request frame to the AP in order to request the AP for a full beacon frame. The AP may transmit a full beacon frame/full beacon response frame/probe response frame in response to the full beacon request frame/probe request frame.

Here, the full beacon frame/probe response frame transmitted to the STA by the AP may be transmitted to each STA in a unicast or broadcast manner.

Figure 21:
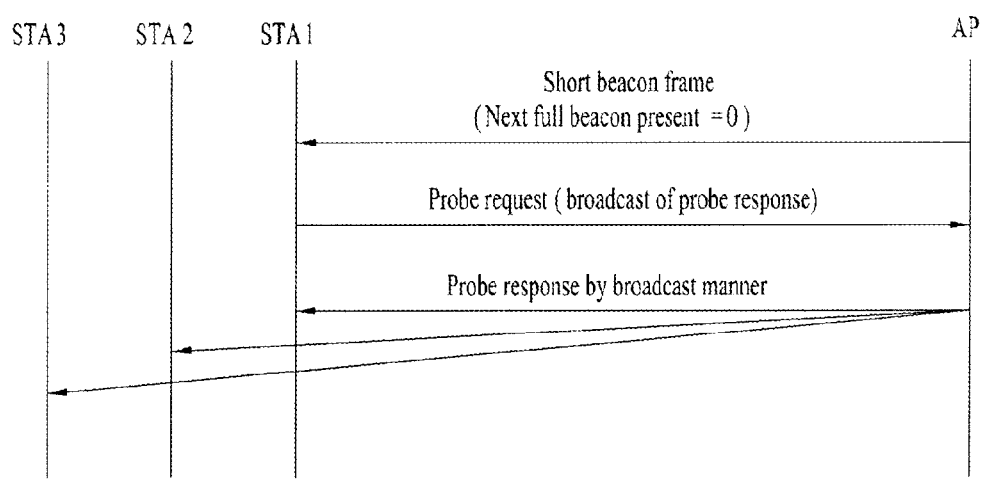
FIG. 21 is a diagram for explanation of transmission of a probe response frame in a broadcast manner.

FIG. 21 is a diagram for explanation of transmission of a probe response frame in a broadcast manner.

In a conventional wireless LAN system, a probe response frame is transmitted in response to a probe request frame and transmitted in a unicast manner for only an STA that transmits a probe request frame. However, as proposed according to the present invention, the probe response frame can perform a function for providing information about a point of time for transmission of a next full beacon like a full beacon response frame. Thus, for the function, it may be appropriate to broadcast a probe response frame.

Information for indicating/requesting transmission of a probe response frame in a broadcast manner (information indicating broadcast of probe response in the example of FIG. 21) may be included in the probe request frame. In this case, an AP may transmit the probe response frame in a broadcast manner.

For example, a value of a reception address field of the probe response frame may be configured as a broadcast identifier (e.g., a wildcard value). In addition, a robustest modulation and coding scheme (e.g., quadrature phase shift keying 1/12, 2 repetition) may be applied such that all STAs in a BSS receive data of the probe response frame transmitted in a broadcast manner.

Embodiment 3

In a conventional wireless LAN operation, since a full beacon including system information is periodically transmitted, when the system information is changed, an STA may obtain the changed system information by receiving a next beacon. However, in an environment in which a full beacon including system information is not periodically transmitted or only a short beacon is transmitted without transmission of a full beacon, even if system information is changed, the STA cannot immediately update the system information.

The present embodiment proposes a method for updating changed information by an STA when the system information is changed in a system in which a full beacon is not transmitted.

In a wireless LAN system (e.g., an IEEE 802.11ah system) using a short beacon frame, a full beacon frame may be defined to contain information indicating whether system information is changed.

Figure 22:
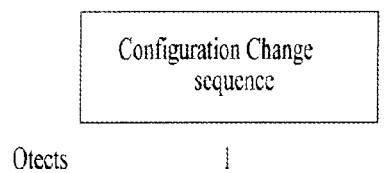
FIG. 22 is a diagram showing a change sequence field.

The information indicating whether the system information is changed may be defined as a change sequence field or a configuration change sequence field as shown in FIG. 22. The change sequence field may be configured as a value indicating whether the system information is changed. In detail, when other system information except for timestamp information is changed, the change sequence field may be defined to be increased by 1 and may have a value of 0 to 255 (i.e., modulo 256 is applied). When a value of the change sequence included in the beacon or probe response frame is maintained as a previous value, the STA may determine that the remaining fields included in the beacon frame or probe response frame are not changed and disregard the remaining fields. However, even if a value of the change sequence is not changed, the STA may operate to obtain a timestamp value.

In addition, according to the present invention, a probe response frame may be defined to include information indicating whether system information is changed (e.g., a change sequence field). That is, when an AP transmits the probe response frame in response to the probe request frame transmitted by the STA, the AP may contain a change sequence corresponding to the system information included in the probe response frame in the probe response frame and transmit the probe response frame.

Accordingly, upon obtaining system information through a full beacon frame or a probe response frame, the STA may store the system information together with a change sequence value related to the obtained system information. Then upon receiving a short beacon frame or a full beacon frame, the STA may compare the value of the change sequence stored in the STA and a change sequence value included in a short beacon or a full beacon frame. As the comparison result, when the two values are the same, the STA may determine that the system information is not changed. As the comparison result, when the two values are different, the STA may perform an operation for updating the changed system information.

Here, when a full beacon frame is transmitted, the STA may obtain the changed system information through the corresponding full beacon frame. However, when the full beacon frame is not transmitted, the STA cannot obtain the changed system information through the full beacon frame. Accordingly, when the full beacon frame is not transmitted, the following procedures may be performed in order to update the changed system information.

Embodiment 3-1

Embodiment 3-1 relates to a method for updating system information using a probe request/response procedure.

A conventional probe request/response procedure may be performed for active scanning during AP discovery of an STA. In addition, the present invention proposes usage of a probe request/response procedure in order to update system information. That is, the conventional probe request/response procedure is performed for association with a corresponding AP by an STA that is not associated with the AP. On the other hand, according to the present invention, an STA that is already associated with an AP may transmit probe request and receive probe response from the AP in order to update system information.

Figure 23:
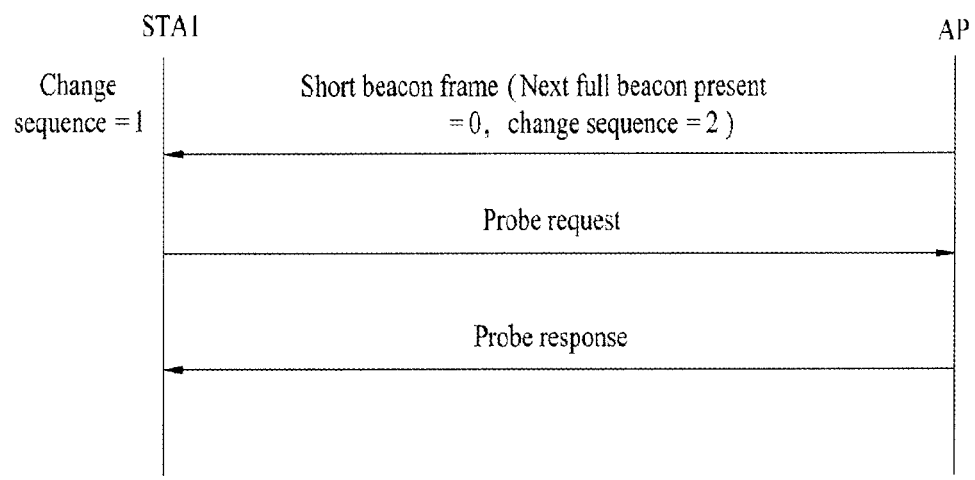
FIG. 23 is a diagram for explanation of a probe request/response procedure according to an example of the present invention.

FIG. 23 is a diagram for explanation of a probe request/response procedure according to an example of the present invention.

An STA that is associated with an AP may receive a short beacon and then check a value of a change sequence to know that system information is changed. As in the example of FIG. 23, when the value of the change sequence stored in the STA is 1 but a value of a change sequence contained in a short beacon is 2, the STA may determine that the system information is changed.

In this case, the STA may transmit a probe request frame to the AP. Here, the STA may further contain, in the probe request frame, indicating that the corresponding probe request frame is a probe request frame for updating system information.

The AP may transmit a probe response frame to the STA in response to the probe request frame from the STA. In this case, the AP may contain current system information (i.e., updated/changed system information) in a probe response frame and provide the probe response frame to the STA.

In addition, the changed system information needs to be commonly applied to all STAs in a BSS. Thus even if one STA transmits probe request in order to update the system information, a probe response frame may not be transmitted in a unicast manner to the one STA and may be transmit in a broadcast manner in order to update system information of another STA in the BSS.

Figure 24:
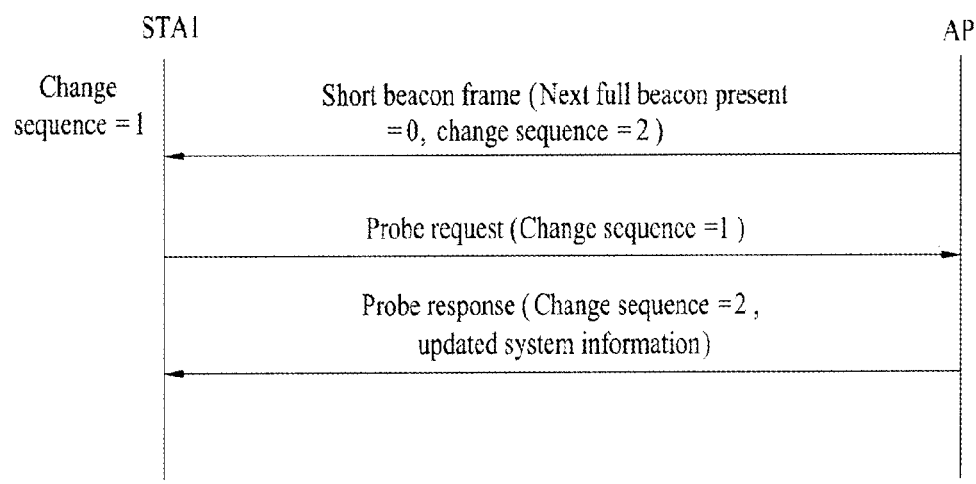
FIG. 24 is a diagram for explanation of a probe request/response procedure according to another example of the present invention.

FIG. 24 is a diagram for explanation of a probe request/response procedure according to another example of the present invention.

The aforementioned probe response frame may include all system information. That is, information of a current network may be provided to all STA without consideration of previous system information stored in an STA. This is because, since system information provided through a conventional full beacon is system information for all STAs in a BSS instead of system information for a specific STA, it is appropriate that the probe response frame includes all system information, and since a conventional probe response is provided for first association of the STA with a network, the conventional probe response is appropriate for an environment in which the corresponding STA does not have information related to the corresponding network.

However, as proposed according to the present invention, when an STA that is already associated with an AP and stores information (i.e., information that is not changed) of a corresponding network performs an operation for updating system information, it is more preferable to effectively provide system information. That is, since it is not necessary for the STA to redundantly provide the same system information as system information that is previously owned by the STA and resource waste can be caused, there is a need for a method for preventing this.

Accordingly, the present invention proposes provision of only changed portion (i.e., only one or more elements of system information to be updated by the STA) of current system information compared with system information (i.e., previous system information) stored by the STA. A probe response frame including only information about change in system information may be referred to as an optimized probe response frame.

Referring to FIG. 24, when a change sequence value that is pre-stored by the STA is 1 and a change sequence value included in a short beacon from an AP is 2, the STA may determine that the system information is changed.

When the STA transmits the probe request frame in order to update the system information, the STA may contain a change sequence value stored in the STA in the probe request frame and transmit the probe request frame. In addition, the STA may further contain, in the probe request frame, information indicating the probe request frame is a probe request frame for updating system information.

When the probe request frame received by the AP includes a change sequence value (or when the probe request frame includes information indicating that the change sequence value and the corresponding probe request frame are used to update system information), the AP may compare current system information and system information (i.e., system information corresponding to a change sequence value stored by the STA) stored by the STA. As the comparison result, only changed portion of various system information may be selected, contained in a probe response frame, and provided to the STA. In the example of FIG. 24, upon receiving a probe request frame including 'change sequence=1', the AP may contain only a current value of changed system information element(s) in the probe response frame compared with previous system information in 'change sequence=2' and transmit the probe response frame to the STA.

FIG. 24 is a diagram for explanation of a probe request/response procedure according to another example of the present invention.

Figure 25:
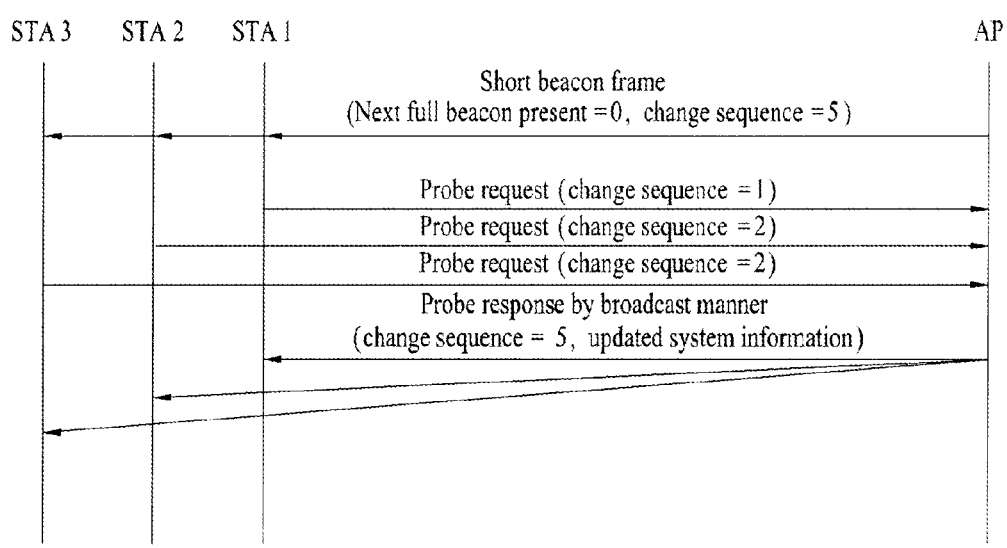
FIG. 25 is a diagram for explanation of a probe request/response procedure according to another example of the present invention.

In the example of FIG. 25, a short beacon frame transmitted by an AP may be transmit to a plurality of STAs STA1, STA2, and STA3 in a broadcast manner. Here, it is assumed that a change sequence value included in the short beacon frame is 5. In addition, it is assumed that change sequence values corresponding to system information stored in each of STA1, STA2, and STA3 are 1, 2, and 2, respectively.

Accordingly, each of the STAs may determine that system information is changed and transmit a probe request frame including a change sequence field configured as a value stored in the corresponding STA to the AP.

In the example of FIG. 25, the AP that receives a probe request frame may transmit a probe response frame including the changed system information (i.e., change sequence=5) in a broadcast manner. The probe response frame transmitted in a broadcast manner may include all information elements of current system information.

Alternatively, an AP that receives a probe request frame from a plurality of STAs may separately (i.e., in a unicast manner) transmit a probe response frame to each STA. In this case, system information included in the probe response frame for each STA may include a changed portion compared with system information stored in the corresponding STA. For example, the probe response frame transmitted to STA1 may include only system information (i.e., a current value of changed information element(s) compared with previous system information in one or more of change sequences=2, 3, 4, and 5) corresponding to 'change sequence=5' that is changed compared with system information corresponding to change sequence=1. For example, a probe response frame transmitted to STA2 or STA3 may include only system information (i.e., a current value of information element(s) that is changed compared with previous system information in one or more of change sequences=3, 4, and 5) corresponding to 'change sequence=5' that is changed compared with system information corresponding to 'change sequence=2'.

An AP that receives a probe request frame for updating system information from a plurality of STAs may determine whether a probe response frame is transmitted in a broadcast manner or a unicast manner. This may be determined in consideration of the amount of changed system information, the number of STAs that request updating of system information, a network jammed state, etc.

Embodiment 3-2

A similar operation to the method for updating system information using the conventional probe request frame/probe response frame described in the aforementioned Embodiment 3-1 can be performed a new request/response frame. The new request/response frame may be referred to as a system information update request frame or a system information update response frame. In addition, the new request/response frame may also be referred to as system information (SI) update request frame or SI update response frame. However, a scope of the present invention is not limited to the term 'new request/response frame' and includes a request/response frame referred to as different terms used for operations proposed according to the present invention.

Figure 26:
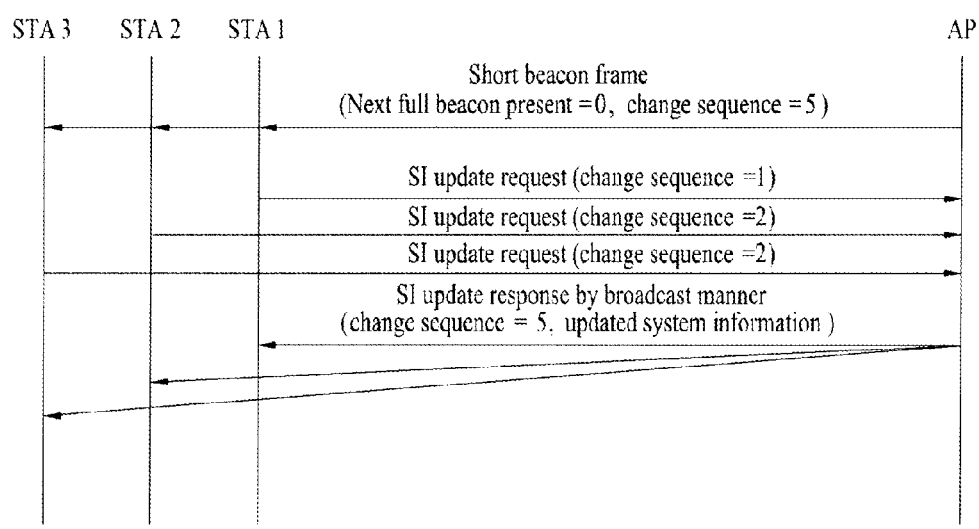
FIG. 26 is a diagram for explanation of a system information (SI) update request/response procedure according to an example of the present invention.

FIG. 26 is a diagram for explanation of an SI update request/response procedure according to an example of the present invention.

The example of FIG. 26 is the same as the example of FIG. 25 except that the probe request frame is replaced with an SI update request frame and the probe response frame is replaced with an SI update response frame, and thus a repeated description will be omitted.

Embodiment 3-3

Figure 27:
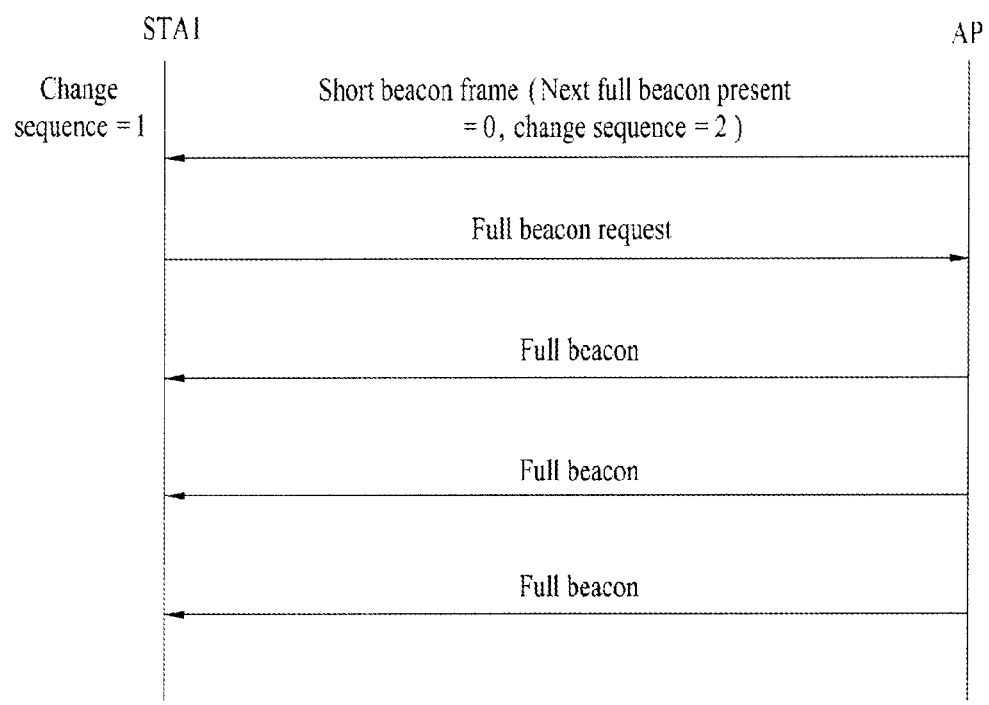
FIG. 27 is a diagram for explanation of a method for updating system information using a full beacon request frame.

FIG. 27 is a diagram for explanation of a method for updating system information using a full beacon request frame.

The example of FIG. 27 is different from the example of FIG. 19 in that an STA transmits a full beacon request frame in consideration of a change sequence included in a short beacon frame.

That is, in the example of FIG. 27, when a change sequence value included in a short beacon frame is different from a change sequence value stored by the STA, the STA may determine that system information is changed. Thus the STA may transmit a full beacon request frame to the AP. That is, even if the STA determine that the AP does not transmit a full beacon frame, when system information is not changed, a full beacon request frame may not be transmitted.

The AP that receives the full beacon request frame may begin to transmit a full beacon frame in response to the full beacon request frame. For example, the AP may receive a full beacon request frame from the STA and then may periodically transmit a full beacon frame for a predetermined period of time or by as much as a predetermined number of times. The predetermined period of time/number of times may be configured according to a value requested by the STA or configured based on a pre-configured value according to system characteristics.

Embodiment 4

As proposed according to the above embodiments, upon receiving a request frame (e.g., a probe request frame or an SI update request frame) including a change sequence value of an STA from the STA, an AP may transmit a response frame (e.g., a probe response frame or an SI update response frame) including a current value of information element(s)

that is changed from current system information with reference to the change sequence value of the corresponding STA.

In order to determine a changed portion compared with previous system information (e.g., system information stored by the STA) from current system information and to transmit the changed portion, an AO needs to store system information corresponding to a previous change sequence value. Here, the AP may store only an element ID of a changed IE rather than storing information element (IE) of the changed system information.

An element ID of changed IE of system information can be given according to Table 1 below.

TABLE 1

| Information Element | Element ID |
|---|---|
| Inclusion of a Channel Switch Announcement | 37 |
| Inclusion of an Extended Channel Switch Announcement | 60 |
| Modification of the EDCA parameters | 12 |
| Inclusion of a Quiet element | 40 |
| Modification of the DSSS Parameter Set | 3 |
| Modification of the CF Parameter Set | 4 |
| Modification of the FH Parameter Set | 8 |
| Modification of the HT Operation element | 45 |
| . . . | . . . |

When the element ID of the changed IE is given according to Table 1 above, a change sequence stored by an AP and an element ID of changed IE may be mapped to each other according to change in system information.

For example, it is assumed that EDCA parameter of change sequence 1 is changed, CF parameter of change sequence 2 is changed, HT operation element of change sequence 3 is changed, and EDCA parameter of change sequence 4 is changed. In this case, the AP may map and store a change sequence value and an element ID corresponding to changed IE. That is, as shown in Table 2 below, information about change in system information may be stored in the AP.

TABLE 2

| Change sequence = 1 | Element ID = 12 |
|---|---|
| Change sequence = 2 | Element ID = 4 |
| Change sequence = 3 | Element ID = 45 |
| Change sequence = 4 | Element ID = 12 |

As shown in Table 2 above, an ID of one IE may be mapped and stored for each change sequence. Assuming that a size of change sequence information is 1 byte (i.e., information for representing one of 256 cases and a size of the mapped element ID information is 1 byte, 2 bytes of total storage space is required in order to represent one element ID mapped to one change sequence.

Assuming that system information is changed according to the above example, a system information updating operation may be performed as follows.

It is assumed that an STA transmits a request frame (e.g., a probe request frame or an SI update request frame) including 'change sequence=2' and in this case, a change sequence corresponding to current system information of a network is 4. In this case, an AP may determine system information that is changed compared with system information (i.e., element ID=45 and 12 in Table 2 above) of change sequence 2. Thus the AP may contain HT operation element and EDCA parameter that correspond to element ID 45 and 12, respectively, in a response frame (e.g., a probe response frame or an SI update response frame) and transmit the response frame to the STA.

When an ID of a changed element is mapped to a change sequence value and is continuously stored whenever system information is changed, overhead of a memory of an AP may be increased. For example, assuming that a size of change sequence information is 1 byte and a sized of element ID information is 1 byte, 512 bytes of total storage space is required in order to store all element ID information mapped to 256 different change sequence values. However, in general, system information is not frequently changed and thus information (i.e., a change sequence value and an element ID value mapped thereto) about change in old system information may not be required. That is, when the AP always maintains 512 bytes of storage space in order to store information related to system information, unnecessary overhead of a memory of the AP may be generated.

Accordingly, in order to reduce overhead for storing information related to change in system information in the AP, the stored information may be refreshed or limited according to conditions such as time, information number, etc.

For example, the AP may limit the stored information according to time condition. A unit of a predetermined period (e.g., several minutes, several hours, several days, several months, several years, etc.) may be determined, the stored information may be maintained for only a corresponding period of time, and expired information may not be maintained or may be deleted. For example, when information (i.e., a change sequence and an element ID value mapped thereto) about change in system information is maintained in a unit of one month, the AP may not maintain information related to change in system information that has been stored for one months. In this case, a size of a storage space required to store information related to change in system information by the AP may not be maintained. For example, when system information has been changed once for recent one month, a required storage space has 2 bytes. However, when system information is chanced 10 times for recent one month, a required storage space has 20 bytes. However, when stored information is limited according to time, if system information is frequently changed, previous system information may not be lost, thereby improving the stability of management of system information.

As another example, an AP may limit stored information according to a number condition of change sequence. The maintained number may be configured as, for example, 4, 8, 12, 16 . . . . For example, it is assumed that an AP is configured to maintain only information corresponding to 8 recent change sequences and a change sequence value of current system information is 16. In this case, the AP maintains change sequence=9, 10, . . . , 16 and element ID information mapped thereto but may not maintain or may delete information (i.e., change sequence=8, 7, 6, 5, . . . and element ID information mapped thereto) related to change in previous system information. In this case, a storage space required to store information related to change in system information by the AP may be maintained to 16 bytes of total size. Accordingly, the efficiency of system information management can be improved.

The time condition and the number condition can be simultaneously applied to a method for storing information related to system information. For example, information related to change in system information for recent one month may be stored and a maximum storage number may be limited to 10 such that system information can be managed using a flexible storage space of 20 bytes or less.

Details described in the above embodiments of the present invention may be independently applied or two or more embodiments may be simultaneously applied.

Figure 28:
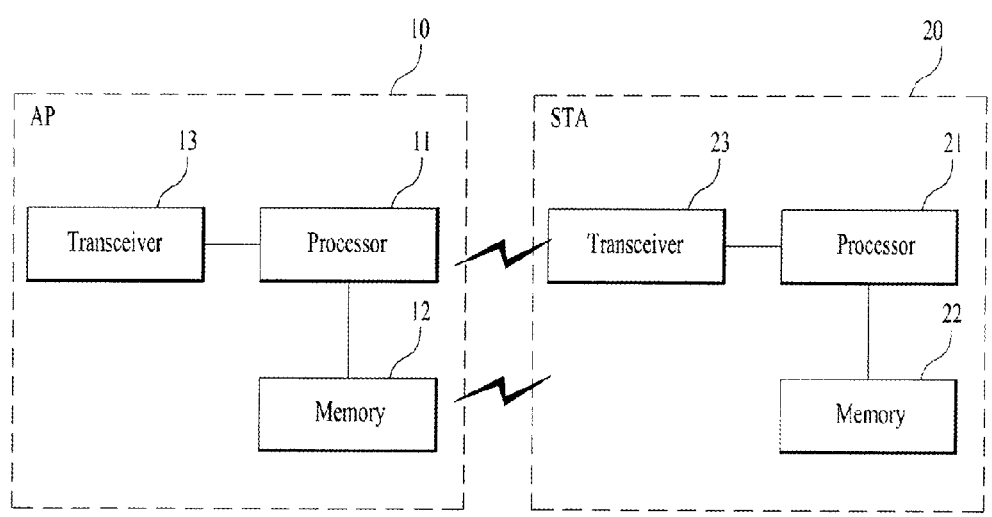
FIG. 28 is a block diagram showing the configuration of a wireless apparatus according to one embodiment of the present invention.

FIG. 28 is a block diagram showing the configuration of a wireless apparatus according to one embodiment of the present invention.

An AP may include a processor 11, a memory 12 and a transceiver 13. An STA 20 may include a processor 21, a memory 22 and a transceiver 23. The transceivers 13 and 23 may transmit/receive a radio frequency (RF) signal and implement a physical layer according to an IEEE 802 system, for example. The processors 11 and 21 may be respectively connected to the transceivers 13 and 21 to implement a physical layer and/or an MAC layer according to the IEEE 802 system. The processors 11 and 21 may be configured to perform operation according to the above-described various embodiments of the present invention. In addition, modules implementing operations of the AP and the STA according to the above-described embodiments of the present invention may be stored in the memories 12 and 22 and may be executed by the processors 11 and 21, respectively. The memories 12 and 22 may be mounted inside or outside the processors 11 and 21 to be connected to the processors 11 and 21 by known means, respectively.

The detailed configuration of the AP and the STA can be implemented such that the above-described embodiments of the present invention are independently applied or two or more embodiments are simultaneously applied and descriptions of redundant parts are omitted for clarity.

The embodiments of the present invention may be achieved by various means, for example, hardware, firmware, software, or a combination thereof.

In a hardware configuration, the methods according to the embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described embodiments of the present invention focus on IEEE 802.11, they are applicable to various mobile communication systems in the same manner.

The invention claimed is:

1. A method for providing system information updates in an access point (AP) of a wireless communication system, the method comprising:
   transmitting, by the AP, a beacon frame comprising a change sequence field to a station (STA),
   wherein a value of the change sequence field increases when the AP determines at least one system information element is updated,
   receiving a probe request frame from the STA when the value of the change sequence field in the beacon frame increases,
   wherein the probe request frame includes a change sequence element, and
   transmitting a probe response frame comprising at least one of a plurality of system information elements when the change sequence element in the probe request frame has a value that is different from the value of the change sequence field.

2. The method according to claim 1, wherein the beacon frame corresponds to a short beacon frame transmitted by the AP.

3. The method according to claim 1, wherein the STA acquires the value of the change sequence field prior to receiving the beacon frame from the AP.

4. The method according to claim 3, wherein the value acquired by the STA is different from the increased value included in the beacon frame.

5. The method according to claim 1, wherein the probe response frame further comprises the change sequence field set to an updated value.

6. The method according to claim 1, wherein the AP does not receive the probe request frame comprising the change sequence field when the value of the change sequence field does not increase.

7. The method according to claim 1, wherein the value of the change sequence field has a size of 1 octet and is set to a value of 0 to 255.

8. An access point (AP) apparatus for providing system information updates in a wireless communication system, the AP apparatus comprising:
   a transceiver; and
   a processor that controls the transceiver to:
   transmit a beacon frame comprising a change sequence field to a station (STA),
   wherein a value of the change sequence field increases when the AP determines at least one system information element is updated,
   receive a probe request frame from the STA when the value of the change sequence field in the beacon frame increases,
   wherein the probe request frame includes a change sequence element, and
   transmit a probe response frame comprising at least one of a plurality of system information elements when the change sequence element in the probe request frame has a value that is different from the value of the change sequence field.

* * * * *